US012593350B2

(12) United States Patent
Yang et al.

(10) Patent No.: US 12,593,350 B2
(45) Date of Patent: *Mar. 31, 2026

(54) CANCELLATION ORDER FOR SCHEDULED UPLINK REPETITIVE TRANSMISSIONS WITH DIFFERENT PRIORITIES

(71) Applicant: QUALCOMM Incorporated, San Diego, CA (US)

(72) Inventors: Wei Yang, San Diego, CA (US); Seyedkianoush Hosseini, San Diego, CA (US); Peter Gaal, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/529,772

(22) Filed: Dec. 5, 2023

(65) Prior Publication Data

US 2024/0107575 A1 Mar. 28, 2024

Related U.S. Application Data

(63) Continuation of application No. 17/502,963, filed on Oct. 15, 2021, now Pat. No. 11,844,104.

(Continued)

(51) Int. Cl.
*H04W 72/566* (2023.01)
*H04W 72/1268* (2023.01)

(52) U.S. Cl.
CPC ..... *H04W 72/569* (2023.01); *H04W 72/1268* (2013.01)

(58) Field of Classification Search
None
See application file for complete search history.

(56) References Cited

U.S. PATENT DOCUMENTS

2019/0261361 A1 8/2019 Xiong et al.
2019/0261391 A1 8/2019 Kundu et al.
(Continued)

FOREIGN PATENT DOCUMENTS

WO 2020064438 A1 4/2020
WO 2020168223 A1 8/2020
(Continued)

OTHER PUBLICATIONS

International Search Report and Written Opinion—PCT/US2021/055322—ISA/EPO—Feb. 16, 2022.
Taiwan Search Report—TW10138559—TIPO—Aug. 29, 2025.

*Primary Examiner* — Benjamin Lamont
(74) *Attorney, Agent, or Firm* — Arent Fox LLP/Qualcomm Incorporated

(57) ABSTRACT

This disclosure relates to collision resolution for overlapping uplink transmissions, and includes a method and apparatus for identifying a plurality of scheduled uplink transmissions that overlap in at least a first slot and a second slot, wherein the plurality of uplink transmissions comprises a high priority uplink transmission scheduled for repetitive transmission across at least a first slot and a second slot and further comprises one or more uplink transmissions scheduled in the first slot and two or more uplink transmissions scheduled in the second slot, wherein the two or more uplink transmissions scheduled in the second slot comprise at least a first low priority uplink transmission and a second high priority uplink transmission; and performing a first collision resolution procedure in the first slot and performing a second collision resolution procedure in the second slot, the second collision resolution procedure being independent of the first collision resolution procedure.

33 Claims, 12 Drawing Sheets

700

Related U.S. Application Data

(60) Provisional application No. 63/093,119, filed on Oct. 16, 2020.

(56) References Cited

U.S. PATENT DOCUMENTS

| | | | |
|---|---|---|---|
| 2019/0306922 A1 | 10/2019 | Xiong et al. | |
| 2020/0068557 A1* | 2/2020 | Lee | H04L 5/0035 |
| 2020/0137768 A1* | 4/2020 | Jose | H04W 72/21 |
| 2020/0314900 A1 | 10/2020 | Hosseini et al. | |
| 2021/0160917 A1 | 5/2021 | Goto et al. | |
| 2021/0329663 A1* | 10/2021 | Wong | H04W 72/569 |
| 2022/0053459 A1* | 2/2022 | Shimezawa | H04W 72/569 |
| 2022/0124745 A1 | 4/2022 | Yang et al. | |
| 2022/0183050 A1* | 6/2022 | Marco | H04L 1/1812 |
| 2022/0217760 A1* | 7/2022 | Iyer | H04L 5/003 |
| 2022/0279538 A1* | 9/2022 | Jung | H04L 5/0044 |
| 2022/0361191 A1* | 11/2022 | Awad | H04W 72/569 |
| 2024/0049275 A1 | 2/2024 | Yang et al. | |

FOREIGN PATENT DOCUMENTS

| | | | | |
|---|---|---|---|---|
| WO | WO-2021203412 A1 * | 10/2021 | | H04W 72/1242 |
| WO | WO-2022024047 A1 * | 2/2022 | | H04L 1/1664 |

* cited by examiner

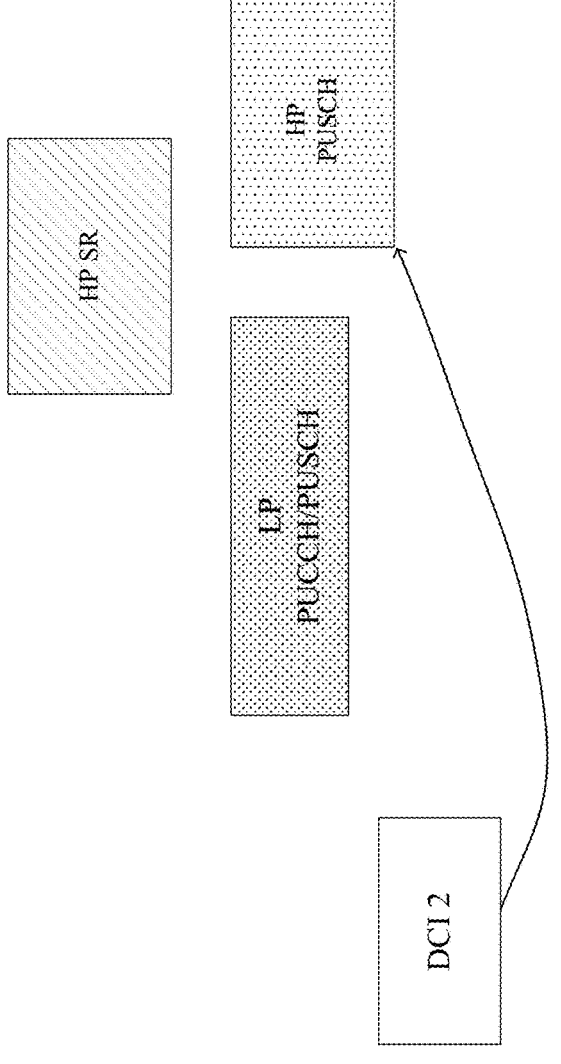
FIG. 6

800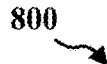

802

Identify two or more scheduled uplink transmissions with different priorities that overlap in at least one slot, wherein at least one of the two or more uplink transmissions is scheduled for repetitive transmission across at least a first slot and a second slot

804

Perform one or more collision resolution procedures in at least one of the first slot and the second slot for the two or more scheduled uplink transmissions with the different priorities that overlap in the at least one slot to resolve collisions for at least one of one or more low priority scheduled uplink transmissions of the two or more scheduled uplink transmissions and one or more high priority scheduled uplink transmissions of the two or more scheduled uplink transmissions

902

Identify two or more scheduled uplink transmissions with different priorities that overlap in at least one slot, wherein at least one of the two or more uplink transmissions comprise a low priority uplink transmission scheduled for repetitive transmission across at least a first slot and a second slot and further comprise one or more high priority uplink transmissions scheduled in the first slot

904

Perform one or more collision resolution procedures in at least one of the first slot to resolve a collision of the low priority uplink transmission with the one or more high priority uplink transmissions scheduled in the first slot by cancelling the low priority uplink transmission scheduled in the first slot

906

Transmitting the low priority uplink transmission scheduled in the second slot responsive to the low priority uplink transmission not overlapping with any transmission of the two or more scheduled uplink transmissions with different priorities that overlap in the at least one slot

FIG. 9

1000

1002

Identify a plurality of scheduled uplink transmissions that overlap in at least a first slot and a second slot, wherein the plurality of uplink transmissions comprises a first high priority uplink transmission scheduled for repetitive transmission across at least the first slot and the second slot and further comprises one or more additional uplink transmissions scheduled in the first slot and two or more additional uplink transmissions scheduled in the second slot, wherein the two or more additional uplink transmissions scheduled in the second slot comprise at least a low priority uplink transmission and a second high priority uplink transmission

1004

Perform a first collision resolution procedure in the first slot and performing a second collision resolution procedure in the second slot, the second collision resolution procedure being independent of the first collision resolution procedure

CANCELLATION ORDER FOR SCHEDULED UPLINK REPETITIVE TRANSMISSIONS WITH DIFFERENT PRIORITIES

CROSS-REFERENCE TO RELATED APPLICATION(S)

The present application is a continuation of U.S. application Ser. No. 17/502,963 entitled "CANCELLATION ORDER FOR SCHEDULED UPLINK REPETITIVE TRANSMISSIONS WITH DIFFERENT PRIORITIES" filed Oct. 15, 2021, which claims benefit of U.S. Provisional Application No. 63/093,119 entitled "CANCELLATION ORDER FOR SCHEDULED UPLINK REPETITIVE TRANSMISSIONS WITH DIFFERENT PRIORITIES" filed Oct. 16, 2020, which are assigned to the assignee hereof and hereby expressly incorporated by reference herein.

TECHNICAL FIELD

The present disclosure relates generally to communication systems, and more particularly, to enhancements in collision resolution for overlapping uplink transmissions with different priorities.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard.

There exists a need for further improvements in 5G NR technology, such as with regard to improving the efficiency in transmitting data. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication at a user equipment (UE), comprising identifying two or more scheduled uplink transmissions with different priorities that overlap in at least one slot, wherein at least one of the two or more uplink transmissions is scheduled for repetitive transmission across at least a first slot and a second slot; and performing one or more collision resolution procedures in at least one of the first slot and the second slot for the two or more scheduled uplink transmissions with the different priorities that overlap in the at least one slot to resolve collisions for at least one of one or more low priority scheduled uplink transmissions of the two or more scheduled uplink transmissions and one or more high priority scheduled uplink transmissions of the two or more scheduled uplink transmissions.

In a further example, an apparatus for wireless communication is provided that includes a transceiver, a memory configured to store instructions, and one or more processors communicatively coupled with the transceiver and the memory. The one or more processors are configured to execute the instructions to identify two or more scheduled uplink transmissions with different priorities that overlap in at least one slot, wherein at least one of the two or more uplink transmissions is scheduled for repetitive transmission across at least a first slot and a second slot; and perform one or more collision resolution procedures in at least one of the first slot and the second slot for the two or more scheduled uplink transmissions with the different priorities that overlap in the at least one slot to resolve collisions for at least one of one or more low priority scheduled uplink transmissions of the two or more scheduled uplink transmissions and one or more high priority scheduled uplink transmissions of the two or more scheduled uplink transmissions.

In another aspect, an apparatus for wireless communication is provided that includes means for identifying two or more scheduled uplink transmissions with different priorities that overlap in at least one slot, wherein at least one of the two or more uplink transmissions is scheduled for repetitive transmission across at least a first slot and a second slot; and means for performing one or more collision resolution procedures in at least one of the first slot and the second slot for the two or more scheduled uplink transmissions with the different priorities that overlap in the at least one slot to resolve collisions for at least one of one or more low priority scheduled uplink transmissions of the two or more scheduled uplink transmissions and one or more high priority scheduled uplink transmissions of the two or more scheduled uplink transmissions.

In yet another aspect, a non-transitory computer-readable medium is provided including code executable by one or more processors to identify two or more scheduled uplink transmissions with different priorities that overlap in at least one slot, wherein at least one of the two or more uplink transmissions is scheduled for repetitive transmission across at least a first slot and a second slot; and perform one or more collision resolution procedures in at least one of the first slot and the second slot for the two or more scheduled uplink transmissions with the different priorities that overlap in the at least one slot to resolve collisions for at least one of one or more low priority scheduled uplink transmissions of the two or more scheduled uplink transmissions and one or more high priority scheduled uplink transmissions of the two or more scheduled uplink transmissions.

According to another example, a method of wireless communication at a UE, comprising identifying two or more scheduled uplink transmissions with different priorities that overlap in at least one slot, wherein at least one of the two or more uplink transmissions comprise a low priority uplink transmission scheduled for repetitive transmission across at least a first slot and a second slot and further comprise one or more high priority uplink transmissions scheduled in the first slot; performing one or more collision resolution procedures in at least one of the first slot to resolve a collision of the low priority uplink transmission with the one or more high priority uplink transmissions scheduled in the first slot by cancelling the low priority uplink transmission scheduled in the first slot; and transmitting the low priority uplink transmission scheduled in the second slot responsive to the low priority uplink transmission not overlapping with any transmission of the two or more scheduled uplink transmissions with different priorities that overlap in the at least one slot.

In a further example, an apparatus for wireless communication is provided that includes a transceiver, a memory configured to store instructions, and one or more processors communicatively coupled with the transceiver and the memory. The one or more processors are configured to execute the instructions to identify two or more scheduled uplink transmissions with different priorities that overlap in at least one slot, wherein at least one of the two or more uplink transmissions comprise a low priority uplink transmission scheduled for repetitive transmission across at least a first slot and a second slot and further comprise one or more high priority uplink transmissions scheduled in the first slot; perform one or more collision resolution procedures in at least one of the first slot to resolve a collision of the low priority uplink transmission with the one or more high priority uplink transmissions scheduled in the first slot by cancelling the low priority uplink transmission scheduled in the first slot; and transmitting the low priority uplink transmission scheduled in the second slot responsive to the low priority uplink transmission not overlapping with any transmission of the two or more scheduled uplink transmissions with different priorities that overlap in the at least one slot.

In another aspect, an apparatus for wireless communication is provided that includes means for identifying two or more scheduled uplink transmissions with different priorities that overlap in at least one slot, wherein at least one of the two or more uplink transmissions comprise a low priority uplink transmission scheduled for repetitive transmission across at least a first slot and a second slot and further comprise one or more high priority uplink transmissions scheduled in the first slot; means for performing one or more collision resolution procedures in at least one of the first slot to resolve a collision of the low priority uplink transmission with the one or more high priority uplink transmissions scheduled in the first slot by cancelling the low priority uplink transmission scheduled in the first slot; and transmitting the low priority uplink transmission scheduled in the second slot responsive to the low priority uplink transmission not overlapping with any transmission of the two or more scheduled uplink transmissions with different priorities that overlap in the at least one slot.

In yet another aspect, a non-transitory computer-readable medium is provided including code executable by one or more processors to identify two or more scheduled uplink transmissions with different priorities that overlap in at least one slot, wherein at least one of the two or more uplink transmissions comprise a low priority uplink transmission scheduled for repetitive transmission across at least a first slot and a second slot and further comprise one or more high priority uplink transmissions scheduled in the first slot; perform one or more collision resolution procedures in at least one of the first slot to resolve a collision of the low priority uplink transmission with the one or more high priority uplink transmissions scheduled in the first slot by cancelling the low priority uplink transmission scheduled in the first slot; and transmitting the low priority uplink transmission scheduled in the second slot responsive to the low priority uplink transmission not overlapping with any transmission of the two or more scheduled uplink transmissions with different priorities that overlap in the at least one slot.

According to another example, a method of wireless communication at a UE, comprising identifying a plurality of scheduled uplink transmissions that overlap in at least a first slot and a second slot, wherein the plurality of uplink transmissions comprises a first high priority uplink transmission scheduled for repetitive transmission across at least the first slot and the second slot and further comprises one or more additional uplink transmissions scheduled in the first slot and two or more additional uplink transmissions scheduled in the second slot, wherein the two or more additional uplink transmissions scheduled in the second slot comprise at least a low priority uplink transmission and a second high priority uplink transmission; and performing a first collision resolution procedure in the first slot and performing a second collision resolution procedure in the second slot, the second collision resolution procedure being independent of the first collision resolution procedure.

In a further example, an apparatus for wireless communication is provided that includes a transceiver, a memory configured to store instructions, and one or more processors communicatively coupled with the transceiver and the memory. The one or more processors are configured to execute the instructions to identify a plurality of scheduled uplink transmissions that overlap in at least a first slot and a second slot, wherein the plurality of uplink transmissions comprises a first high priority uplink transmission scheduled for repetitive transmission across at least the first slot and the second slot and further comprises one or more additional uplink transmissions scheduled in the first slot and two or more additional uplink transmissions scheduled in the second slot, wherein the two or more additional uplink transmissions scheduled in the second slot comprise at least a low priority uplink transmission and a second high priority uplink transmission; and perform a first collision resolution procedure in the first slot and performing a second collision resolution procedure in the second slot, the second collision resolution procedure being independent of the first collision resolution procedure.

In another aspect, an apparatus for wireless communication is provided that includes means for identifying a plurality of scheduled uplink transmissions that overlap in at least a first slot and a second slot, wherein the plurality of uplink transmissions comprises a first high priority uplink transmission scheduled for repetitive transmission across at least the first slot and the second slot and further comprises one or more additional uplink transmissions scheduled in the first slot and two or more additional uplink transmissions scheduled in the second slot, wherein the two or more additional uplink transmissions scheduled in the second slot comprise at least a low priority uplink transmission and a second high priority uplink transmission; and means for performing a first collision resolution procedure in the first slot and performing a second collision resolution procedure in the second slot, the second collision resolution procedure being independent of the first collision resolution procedure.

In yet another aspect, a non-transitory computer-readable medium is provided including code executable by one or more processors to identify a plurality of scheduled uplink transmissions that overlap in at least a first slot and a second slot, wherein the plurality of uplink transmissions comprises a first high priority uplink transmission scheduled for repetitive transmission across at least the first slot and the second slot and further comprises one or more additional uplink transmissions scheduled in the first slot and two or more additional uplink transmissions scheduled in the second slot, wherein the two or more additional uplink transmissions scheduled in the second slot comprise at least a low priority uplink transmission and a second high priority uplink transmission; and perform a first collision resolution procedure in the first slot and performing a second collision resolution procedure in the second slot, the second collision resolution procedure being independent of the first collision resolution procedure.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 6 is a schematic diagram of another example of a cancellation order for multiple scheduled uplink transmissions overlap across a single slot operable in the system of FIG. 1 in accordance with one or more aspects of the present disclosure.

FIG. 8 is a flowchart of an example method of wireless communication of a UE operable in the system of FIG. 1 in accordance with one or more aspects of the present disclosure.

FIG. 9 is a flowchart of another example method of wireless communication of a UE operable in the system of FIG. 1 in accordance with one or more aspects of the present disclosure.

FIG. 10 is a flowchart of another example method of wireless communication of a UE operable in the system of FIG. 1 in accordance with one or more aspects of the present disclosure.

DETAILED DESCRIPTION

Figure 1:
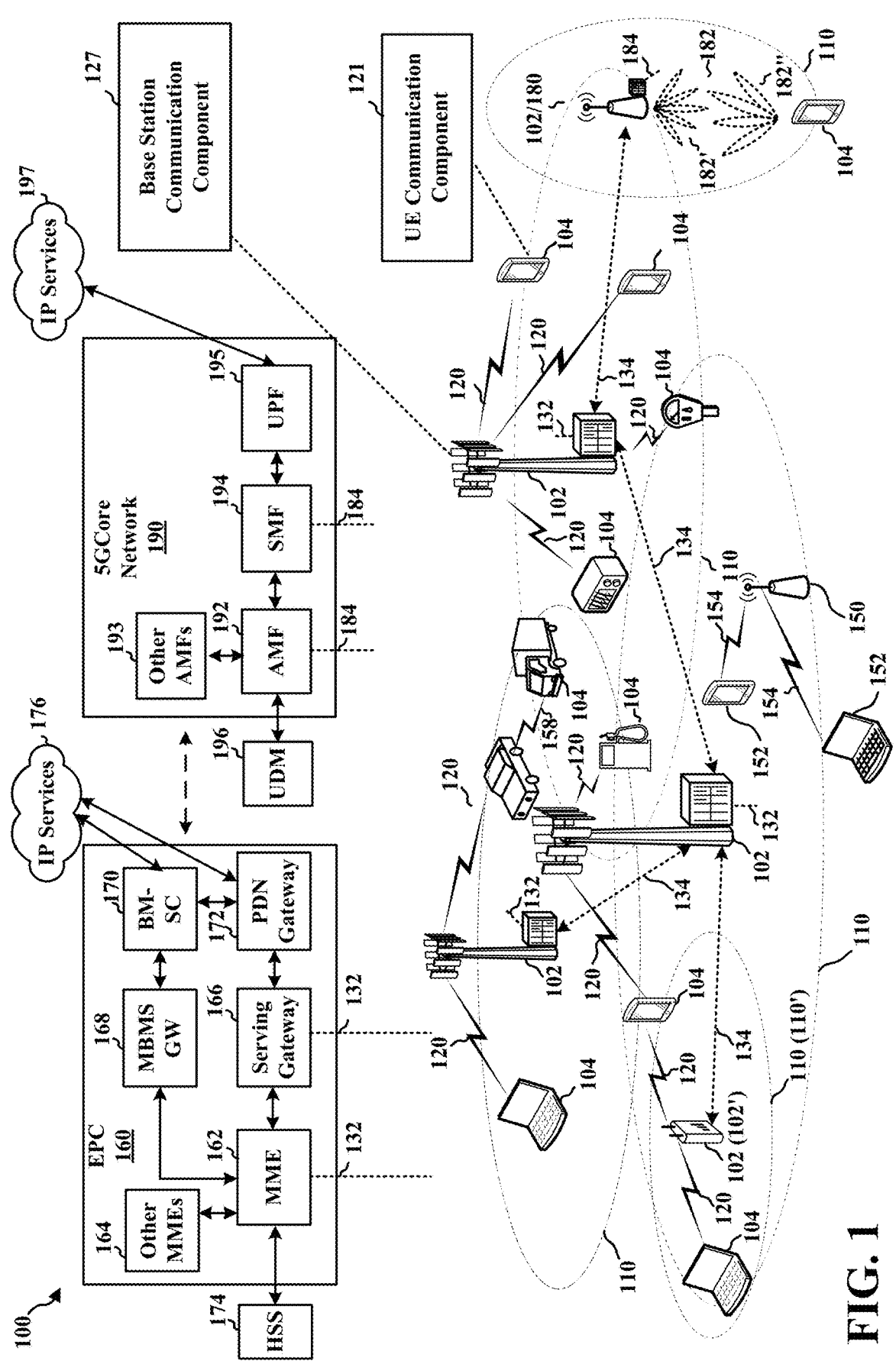
FIG. 1 is a schematic diagram of an example of a wireless communications system in accordance with one or more aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present aspects generally relate to collision resolution for overlapping uplink transmissions with different priorities. For example, in new radio (NR) Release 15, if two uplink transmissions overlap in time (i.e., in overlapping in at least one orthogonal frequency-division multiplexing (OFDM) symbol within a slot), and at least one of the uplink transmissions is a physical uplink control channel (PUCCH) with repetition (e.g., multi-slot PUCCH), then a user equipment (UE) that is scheduling the uplink transmissions may drop one of the uplink transmissions according to the following order of priority (in descending order): hybrid access request (HARD) acknowledgement (ACK), scheduling request (SR), channel state information (CSI) of high priority, CSI of low priority, and physical uplink shared channel (PUSCH).

In an aspect, for NR Release 16, if multiple uplink transmissions with different priorities overlap in time, the UE may cancel the low priority uplink transmissions and only transmit the high priority uplink transmission. For example, the priority refers to the priority index configured for each uplink channel (e.g., in Release 16, the priority index may be either 0 or 1, where 1 corresponds to a high priority and 0 corresponds to a low priority). However, enhancements are needed to resolve collisions between overlapping uplink transmissions with different priorities if at least one of the uplink transmission is an uplink transmission with repetition.

Specifically, the present disclosure relates to enhancements to the collision resolution for overlapping uplink transmissions with different priorities. For example, two or more scheduled uplink transmissions with different priorities may overlap in at least one slot. Consequently, it is desired for the UE to perform a collision resolution procedure between overlapping uplink transmissions with different priorities if at least one of the uplink transmission is an uplink transmission with repetition.

As such, the present disclosure enables collision resolution for overlapping uplink transmissions with different priorities. Specifically, the present disclosure provides apparatus and methods at a UE for identifying two or more scheduled uplink transmissions with different priorities that overlap in at least one slot, wherein at least one of the two or more uplink transmissions is scheduled for repetitive transmission across at least a first slot and a second slot; and performing one or more collision resolution procedures in at least one of the first slot and the second slot for the two or more scheduled uplink transmissions with the different priorities that overlap in the at least one slot to resolve collisions for at least one of one or more low priority scheduled uplink transmissions of the two or more scheduled uplink transmissions and one or more high priority scheduled uplink transmissions of the two or more scheduled uplink transmissions.

In another aspect, the present disclosure provides apparatus and methods at a UE for identifying two or more scheduled uplink transmissions with different priorities that overlap in at least one slot, wherein at least one of the two or more uplink transmissions comprise a low priority uplink transmission scheduled for repetitive transmission across at least a first slot and a second slot and further comprise one or more high priority uplink transmissions scheduled in the first slot; performing one or more collision resolution procedures in at least one of the first slot to resolve a collision of the low priority uplink transmission with the one or more high priority uplink transmissions scheduled in the first slot by cancelling the low priority uplink transmission scheduled in the first slot; and transmitting the low priority uplink transmission scheduled in the second slot responsive to the low priority uplink transmission not overlapping with any transmission of the two or more scheduled uplink transmissions with different priorities that overlap in the at least one slot.

In another aspect, the present disclosure provides apparatus and methods at a UE for identifying a plurality of scheduled uplink transmissions that overlap in at least a first slot and a second slot, wherein the plurality of uplink transmissions comprises a first high priority uplink transmission scheduled for repetitive transmission across at least the first slot and the second slot and further comprises one or more additional uplink transmissions scheduled in the first slot and two or more additional uplink transmissions scheduled in the second slot, wherein the two or more additional uplink transmissions scheduled in the second slot comprise at least a low priority uplink transmission and a second high priority uplink transmission; and performing a first collision resolution procedure in the first slot and performing a second collision resolution procedure in the second slot, the second collision resolution procedure being independent of the first collision resolution procedure.

Consequently, the aspects described herein enable the efficient resolution of overlapping scheduled uplink transmissions with different priorities.

These and other features of the present disclosure are discussed in detail below with regard to FIGS. 1-12.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system 100. The wireless communications system (also referred to as a wireless wide area network (WWAN)) includes base stations 102, UEs 104, an Evolved Packet Core (EPC) 160, and another core network 190 (e.g., a 5G Core (5GC)).

In certain aspects, a respective UE 104 may include a UE communication component 121 for performing collision resolution for overlapping uplink transmissions with different priorities. The UE 104 may have an access link 120 directly with the base station 102. The UE communication component 121 of the UE 104 may be selectively configured to schedule a plurality of uplink transmissions with different priorities, and perform collision resolution for overlapping uplink transmissions with different priorities.

Similarly, the base station 102 may include a base station communication component 127 configured to receive uplink transmissions from UE 104 on one or more uplink channels, as described herein.

Further details of these operations performed by the UE 104 and the base station 102 are discussed in more detail below.

The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5G core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120, including access links 120a and 120b, between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158, one example of which includes sidelink 158a. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figures 2A, 2B, 2C, 2D:
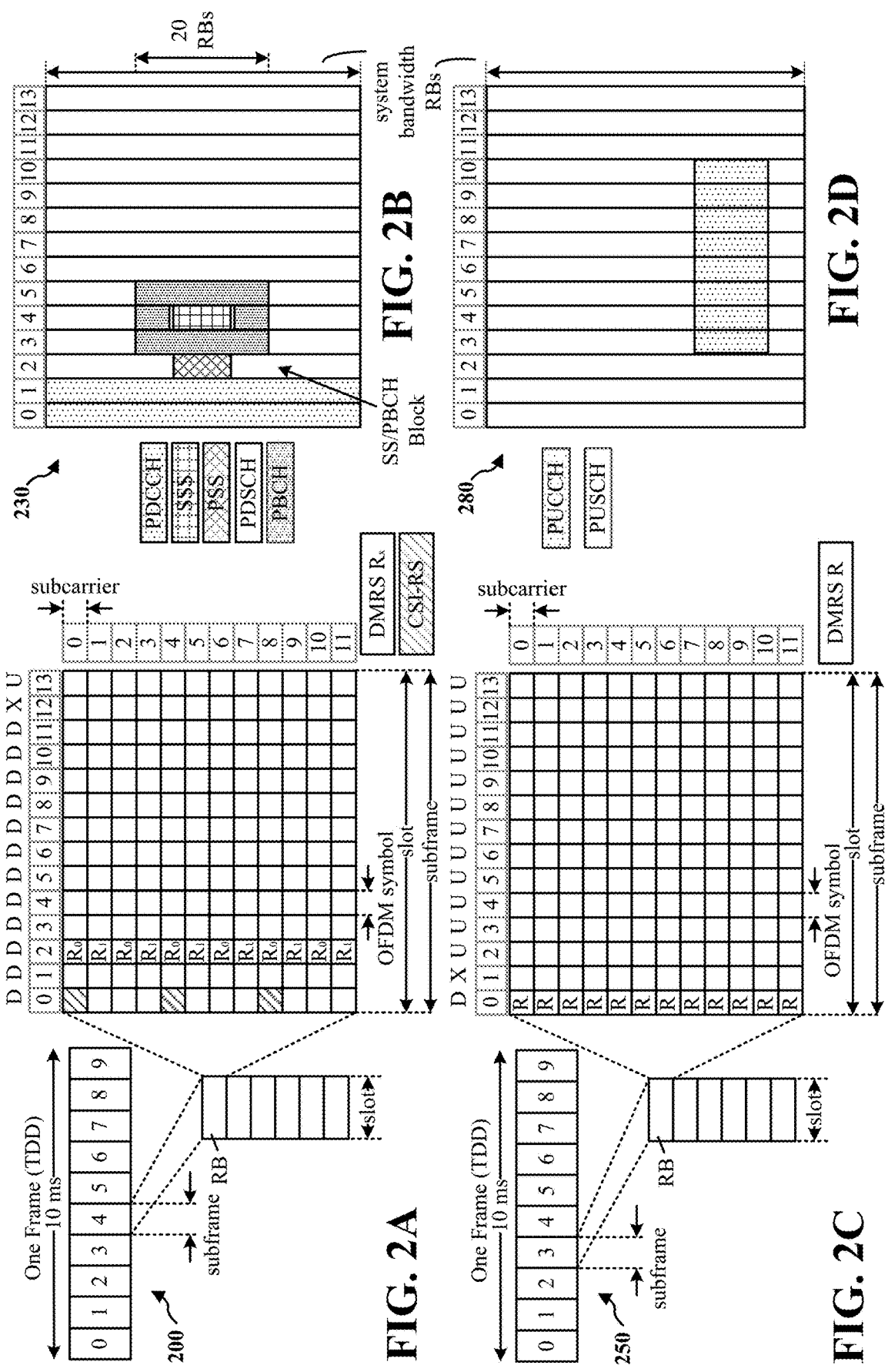
FIGS. 2A, 2B, 2C, and 2D are diagrams of examples of a first 5G/NR frame, DL channels within a 5G/NR subframe, a second 5G/NR frame, and UL channels within a 5G/NR subframe, respectively, for use in communications between two of the communicating nodes in the system of FIG. 1 in accordance with one or more aspects of the present disclosure.

FIGS. 2A-2D include diagrams of example frame structures and resources that may be utilized in communications between the base stations 102, the UEs 104 described in this disclosure. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency domain duplexed (FDD) in which for a particular set of subcarriers (carrier system bandwidth), subframes within the set of subcarriers are dedicated for either DL or UL, or may be time domain duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
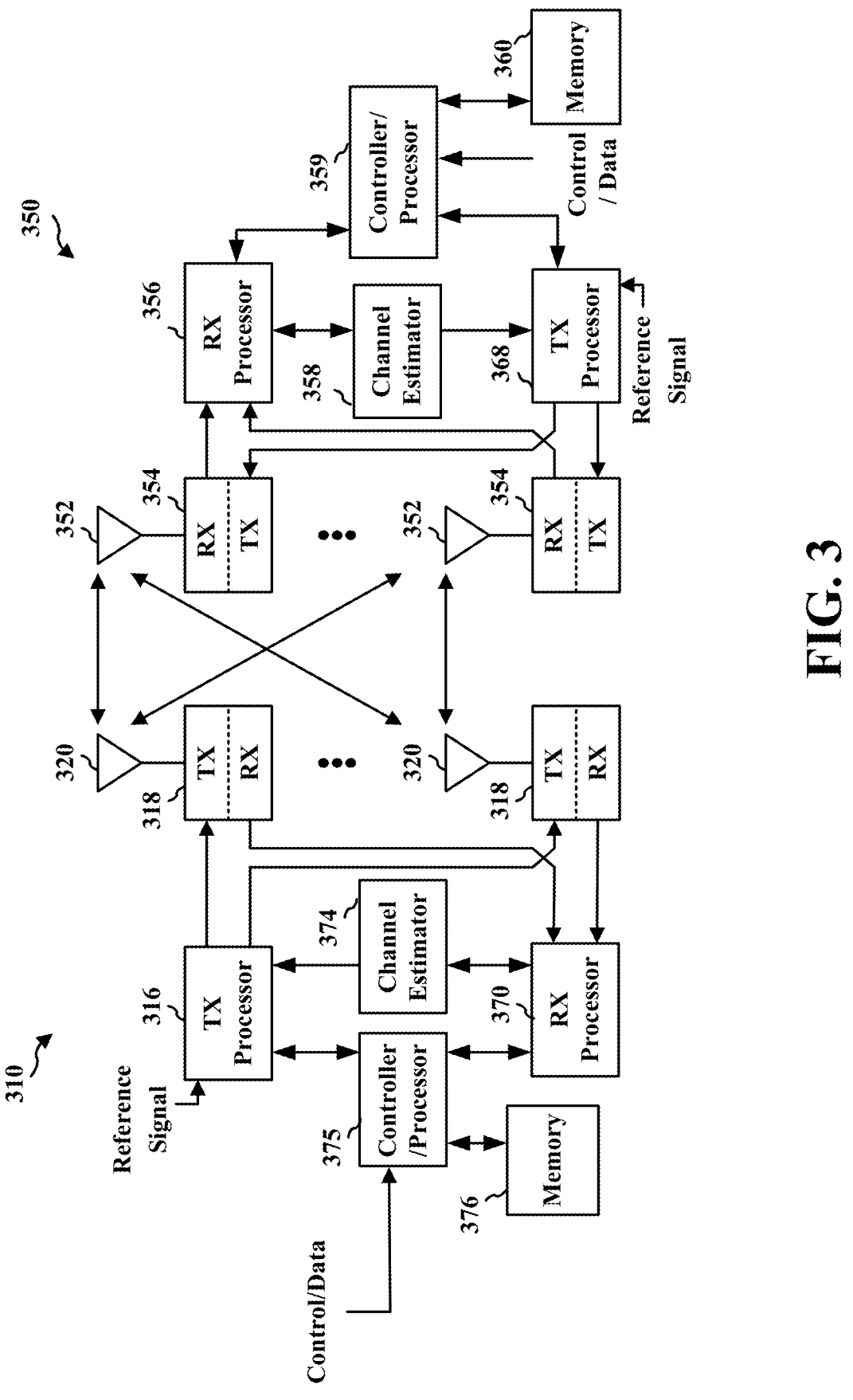
FIG. 3 is a schematic diagram of an example of hardware components of two of the communicating nodes in the system of FIG. 1 in accordance with one or more aspects of the present disclosure.

FIG. 3 is a diagram of hardware components of an example transmitting and/or receiving (TX/RX) nodes 310 and 350, which may be any combinations of base station 102-UE 104 communications, and/or UE 104-UE 104 communications in system 100. For example, such communications may including, but are not limited to, communications such as a base station transmitting to a UE, a UE transmitting to a second UE, a second UE transmitting to a UE, or a UE transmitting to a base station in a wireless communications system. In one specific example, the TX/RX node 310 may be an example implementation of base station 102 and where TX/RX node 350 may be an example implementation of UE 104. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the tx/rx node 350. Each spatial stream may then be provided to a different antenna 320 via a separate transmitter 318TX. Each transmitter 318TX may modulate an RF carrier with a respective spatial stream for transmission.

At the TX/RX node 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the TX/RX node 350. If multiple spatial streams are destined for the TX/RX node 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the TX/RX node 310. These soft decisions may be based on channel estimates computed by the channel estimator 358. The soft decisions are then decoded and deinterleaved to recover the data and control signals that were originally transmitted by the TX/RX node 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the TX/RX node 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the TX/RX node 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the TX/RX node 310 in a manner similar to that described in connection with the receiver function at the TX/RX node 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the tx/rx node 350. IP packets from the controller/processor 375 may be provided to the EPC 160. The controller/processor 375 is also responsible for error detection using an ACK and/or NACK protocol to support HARQ operations.

In an implementation at a UE, at least one of the TX processor 368, the RX processor 356, and the controller/processor 359 may be configured to perform aspects in connection with UE communication component 121 of FIG. 1.

In an implementation at a base station or network entity, at least one of the TX processor 316, the RX processor 370, and the controller/processor 375 may be configured to perform aspects in connection with base station communication component 127 of FIG. 1.

Figure 4:
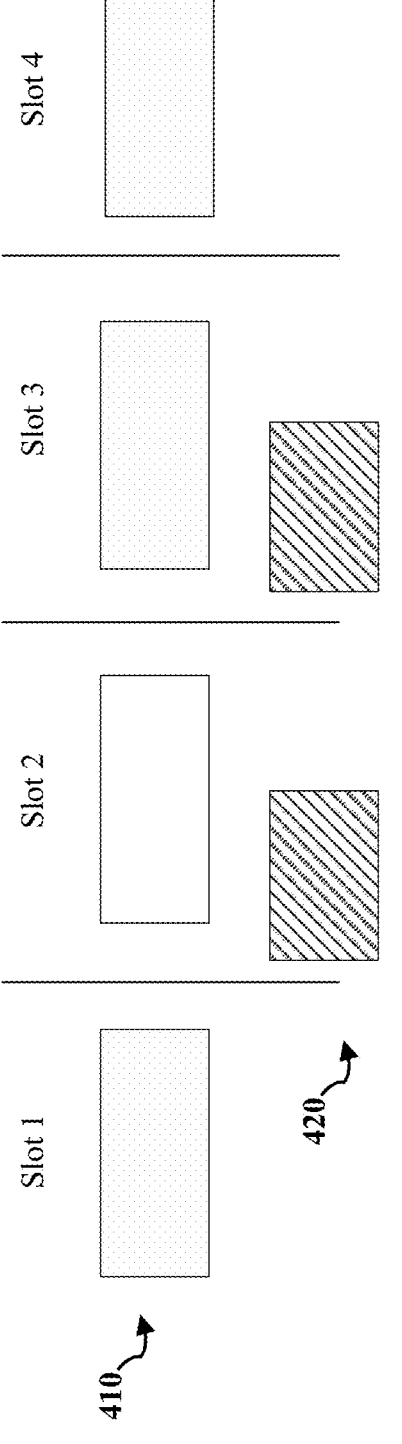
FIG. 4 is a schematic diagram of an example of a transmission scheme of multiple uplink transmissions across a plurality of slots in accordance with one or more aspects of the present disclosure.

Referring to FIG. 4, a schematic diagram 400 illustrating an example of a transmission scheme of multiple uplink transmissions across a plurality of slots operable in the system of FIG. 1 is described. For example, UE 104 and base station 102 (e.g., gNB) may communicate with one another, and specifically, UE 104 may communicate the uplink transmissions of a first priority 410 and a second priority 420 in the plurality of slots to base station 102. In some instances, uplink transmissions 410 may overlap with uplink transmissions 420 in one or more time slots.

In an aspect, when UE 104 determines overlapping for physical uplink control channel (PUCCH) and/or physical uplink shared channel (PUSCH) transmissions of different priority indexes, UE 104 first resolves the overlapping for PUCCH and/or PUSCH transmissions 420 of lower priority index. Then, if a transmission of a first PUCCH 410 of higher priority index scheduled by a downlink control information (DCI) format in a physical downlink control channel (PDCCH) reception would overlap in time with a transmission of a second PUSCH or a second PUCCH 420 of lower priority index, UE 104 cancels the transmission of the second PUSCH or the second PUCCH 420 before the first symbol in the slot that would overlap with the first PUCCH transmission 410. In another example, if a transmission of a first PUSCH 410 of larger priority index scheduled by a DCI format in a PDCCH reception would overlap in time with a transmission of a second PUCCH 420 of smaller priority index, UE 104 cancels the transmission of the second PUCCH 420 before the first symbol that would overlap with the first PUSCH transmission 410 where the overlapping is applicable before or after resolving overlapping among channels of larger priority index. In this aspect, the cancellation order specified above does not apply if the high priority transmission (that cancels a low priority transmission) is not scheduled by a DCI format in a PDCCH reception.

Figure 5:
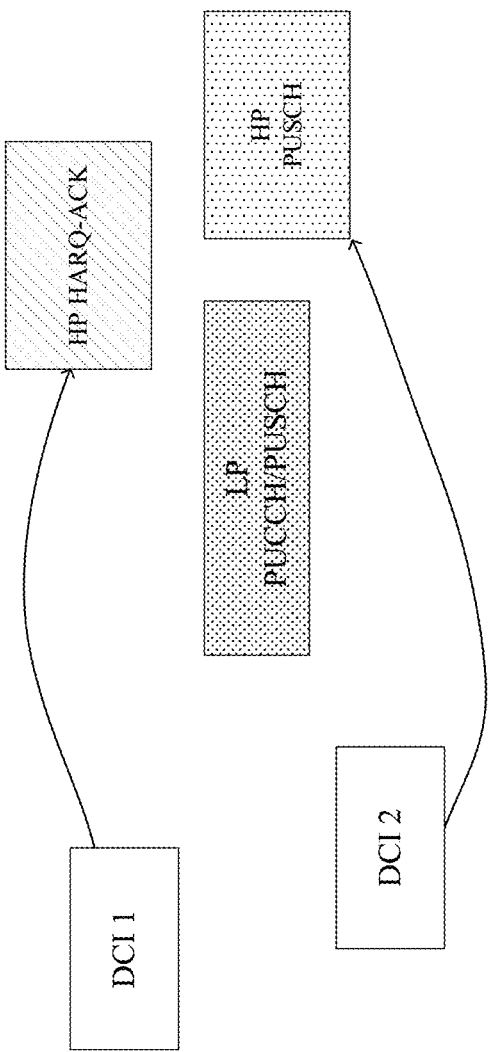
FIG. 5 is a schematic diagram of an example of a cancellation order for multiple scheduled uplink transmissions overlap across a single slot operable in the system of FIG. 1 in accordance with one or more aspects of the present disclosure.

Referring to FIG. 5, a schematic diagram 500 illustrating an example of a cancellation order for multiple scheduled uplink transmissions overlap across a single slot operable in the system of FIG. 1 is described. For example, UE 104 and base station 102 (e.g., gNB) may communicate with one another, and specifically, UE 104 may communicate the uplink transmissions of different priorities in a single slot to base station 102. In some instances, a plurality of uplink transmissions may overlap in a single slot. High priority transmissions correspond to transmissions with priority index 1, and low priority transmissions correspond to transmissions with priority index 0

In an aspect, UE 104 schedules, by a first DCI (DCI 1), a high priority (HP) HARQ-ACK transmission that overlaps with a low priority (LP) PUCCH or PUSCH transmission. Subsequently, UE 104 receives a second DCI (DCI 2) that schedules a high priority PUSCH that does not overlap with the low priority PUCCH or PUSCH transmission. UE 104 may multiplex the high priority HARQ-ACK with the high priority PUSCH. In an example, if all transmissions are scheduled at the same time, then UE 104 may be able to resolve the overlapping between high priority transmissions first, and then since the resulting high priority transmission (which is the PUSCH in this example) is not overlapping with the low priority channel, UE 104 may not need to cancel the low priority transmission.

In an aspect, UE 104 may need to resolve the collisions as long as UE 104 receives at least one high priority grant (e.g., DCI 1), and UE 104 may not wait for other high priority grants. For example, at the time of reception of DCI 1, UE 104 is unaware whether a DCI 2 will be transmitted by base station 102. UE 104 may cancel the low priority transmissions upon reception of the first high priority DCI. The cancelled PUCCH/PUSCH transmission may not be resumed at a later point in time even if UE 104 discovers that the high priority HARQ-ACK was moved to another uplink channel.

Referring to FIG. 6, a schematic diagram 600 illustrating an example of a cancellation order for multiple scheduled uplink transmissions overlap across a single slot operable in the system of FIG. 1 is described. For example, UE 104 and base station 102 (e.g., gNB) may communicate with one another, and specifically, UE 104 may communicate the uplink transmissions of different priorities in a single slot to base station 102. In some instances, a plurality of uplink transmissions may overlap in a single slot.

In an aspect, UE 104 is configured with a high priority scheduling request (SR) transmission that overlaps with a low priority PUCCH or PUSCH transmission. Subsequently, UE 104 receives a second DCI (e.g., DCI 2) that schedules a high priority PUSCH that does not overlap with the low priority PUCCH or PUSCH transmission. UE 104 may drop the high priority SR and transmit the high priority PUSCH.

In an aspect, due to the high priority SR not being scheduled by a DCI format (i.e., instead being configured via RRC) at the time when UE 104 receives the high priority PUSCH, UE 104 is aware that the high priority SR will be cancelled. As a result, in this example, UE 104 may cancel the high priority SR, but not cancel the low priority PUCCH or PUSCH transmission. Unlike the scheduling of the high priority HARQ-ACK in FIG. 5, the high priority SR of FIG. 6 is not scheduled by a DCI format in a PDCCH.

Figure 7:
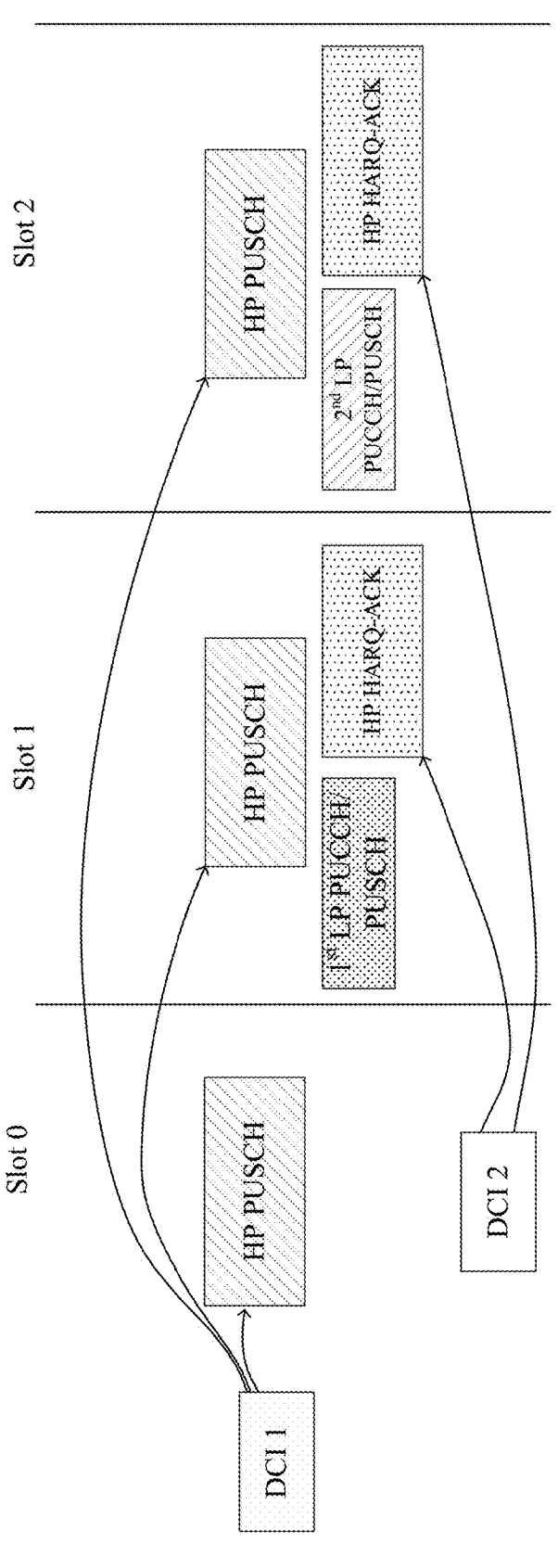
FIG. 7 is a schematic diagram of an example of a transmission scheme of multiple uplink transmissions across a plurality of slots operable in the system of FIG. 1 in accordance with one or more aspects of the present disclosure.

Referring to FIG. 7, a schematic diagram 700 illustrating an example of multiple uplink transmissions across a plurality of slots operable in the system of FIG. 1 is described. For example, UE 104 and base station 102 (e.g., gNB) may communicate with one another, and specifically, UE 104 may schedule a plurality of uplink transmissions to communicate to base station 102. UE 104 may perform one or more collision resolution procedures in at least one of the first slot and the second slot for the two or more scheduled uplink transmissions with the different priorities that overlap in the at least one slot to resolve collisions for at least one of one or more low priority scheduled uplink transmissions of the two or more scheduled uplink transmissions and one or more high priority scheduled uplink transmissions of the two or more scheduled uplink transmissions.

In an aspect, UE 104 may identify overlapping uplink transmissions with different priorities. For example, at least one of the overlapping uplink transmissions are scheduled with repetition (e.g., multi-slot PUCCH or PUSCH transmissions). If an overlap without repetitive scheduled transmissions occurs then UE 104 may perform a collision resolution procedure as described in FIG. 5.

Further, UE 104 may resolve collisions between low priority scheduled uplink transmissions. That is, if none of the low priority scheduled uplink transmissions are a PUCCH transmission with repetition, then UE 104 may multiplex all of the low priority scheduled uplink transmissions that overlap. If at least one of the overlapping low priority scheduled uplink transmissions is a PUCCH transmission with repetition, then UE 104 may drop the low priority scheduled uplink transmission based on the priority of the transmission type (e.g., in descending order: HARQ ACK, SR, CSI of high priority, CSI of low priority, and PUSCH). As a result of Step 1, there is no overlapping low priority scheduled transmissions in any of the multiple slots.

Accordingly, UE 104 may perform one or more collision resolution procedures for any remaining high priority scheduled uplink transmissions that may overlap upon completing resolution of collisions between low priority scheduled uplink transmissions.

In a first aspect, UE 104 may, on a per-slot basis (for example, for each of the repetitions), and in a given slot of the multiple slots, drop a low priority scheduled uplink transmission before and after resolving the collision between overlapping high priority scheduled uplink transmissions if a low priority scheduled uplink transmission overlaps with a high priority scheduled uplink transmission. However, if none of the high priority scheduled uplink transmissions are a PUCCH transmission with repetition, then UE 104 may multiplex the high priority scheduled uplink transmissions. If at least one of the overlapping high priority scheduled uplink transmissions is a PUCCH transmission with repetition, then UE 104 may drop the high priority scheduled uplink transmission based on the priority of the transmission type (e.g., in descending order: HARQ ACK, SR, CSI of high priority, CSI of low priority, and PUSCH).

For example, the UE 104 may identify a plurality of uplink transmissions that overlap in at least a first slot (e.g., slot 1) and a second slot (e.g., slot 2). As illustrated, a high priority PUSCH transmission is scheduled by a first DCI in slots 0, 1, 2 with a repetition factor 3 (e.g., a first high priority uplink transmission scheduled for repetitive transmission across at least the first slot and the second slot), and a high priority HARQ-ACK is scheduled by a second DCI in slot 1 and slot 2 (e.g., high priority HARQ-ACK in slot 1 comprising an additional uplink transmission in the first slot and the high priority HARQ-ACK in slot 2 comprising an additional uplink transmission in the second slot, e.g., a second high priority uplink transmission). Additionally, two single-slot low priority uplink transmissions are scheduled in slot 1 and slot 2, respectively (e.g, low priority uplink transmission in slot 1 comprising an additional uplink transmission in slot 1 and low priority uplink transmission in slot 2 comprising an additional uplink transmission in slot 2). Accordingly, UE 104 may drop both low priority scheduled uplink transmissions due to overlapping with the high priority PUSCH transmission (and its repetition), and drop the high priority PUSCH transmissions in slot 1 and slot 2, due to overlapping with the high priority HARQ-ACK. For example, the collision resolution in slot 1 and slot 2 are performed by UE 104 separately such that a first collision resolution procedure is performed in the first slot and a second collision resolution procedure is performed in the second slot, where the second collision resolution procedure is independent of the first collision resolution procedure. That is, the collision resolution in slot 1 will not impact the collision resolution in slot 2. Even in scenarios where the first collision resolution procedure happens to be the same as the second collision resolution procedure, the first and second collision resolution procedures are performed independently of each other. Each of the repetitions of the uplink transmissions (e.g., HARQ-ACK or PUSCH) may be configured as a transmission that is scheduled by the corresponding DCI format.

Additionally or alternatively, if UE 104 determines at least two high priority scheduled uplink transmissions are involved in a collision, and they overlap in more than one slot, then UE 104 may perform the collision resolution procedure for a first slot and then subsequent slots.

For example, in the first slot of the overlapping slots between the at least two high priority scheduled uplink transmissions, UE 104 may determine whether any of the one or more low priority scheduled uplink transmissions of the two or more scheduled uplink transmissions overlaps with any of the at least two high priority scheduled uplink transmissions of the two or more scheduled uplink transmissions in the first slot, wherein any of the at least two high priority scheduled uplink transmissions are scheduled by a physical downlink control channel (PDCCH); and cancel any of the one or more low priority scheduled uplink transmissions from the first slot based on a determination that any of the one or more low priority scheduled uplink transmissions of the two or more scheduled uplink transmissions overlaps with any of the at least two high priority scheduled uplink transmissions of the two or more scheduled uplink transmissions. In this example, if the at least two high priority scheduled uplink transmissions are scheduled by a PDCCH, then UE 104 may cancel the low priority scheduled uplink transmission as soon as the DCI for one of the at least two high priority scheduled uplink transmissions is received.

For each slot in the remaining overlapping slots in which the two high priority scheduled uplink transmissions overlap, UE 104 may first cancel the high priority scheduled uplink transmission with a lower priority type (i.e., according to the priority index in descending order: HARQ ACK, SR, CSI of high priority, CSI of low priority, and PUSCH) among the overlapping high priority scheduled uplink transmissions, and then cancel the low priority scheduled uplink transmission if the low priority scheduled uplink transmission still overlaps with the remaining high priority scheduled uplink transmissions.

In the example, UE 104 may only cancel the low priority scheduled uplink transmission in the first slot, but not cancel the low priority scheduled uplink transmission in the second slot based on the collision between high priority PUSCH transmission with repetition and high priority HARQ-ACK with repetition being resolved in slot 1, and the same decision shall be carried to the remaining slots. In such an example, where UE 104 only cancels the low priority scheduled uplink transmission in the first slot, but not in the second slot (and any further remaining slots), the UE 104 may proceed as illustrated in FIG. 9, where the first and second low priority scheduled uplink transmissions (LP PUCCH/PUSCHs in slots 1 and 2) represent a low priority uplink transmission scheduled for repetitive transmission across at least a first slot and a second slot. The UE 104 can identify two or more scheduled uplink transmissions with different priorities that overlap in at least one slot, illustrated in FIG. 7 as $1^{st}$ LP PUCCH/PUSCH and HP PUSCH that overlap, at least partially, in slot 1. As illustrated in FIG. 7, the two or more scheduled uplink transmissions with different priorities that overlap in the at least one slot include the $1^{st}$ and $2^{nd}$ LP PUCCH/PUSCH, as well as the HP PUSCH that overlaps with the $1^{st}$ and $2^{nd}$ LP PUCCH/PUSCH in both slots 1 and 2. By performing one or more collision resolution procedures, as discussed elsewhere herein, the collision of the low priority uplink transmission (e.g., $1^{st}$ LP PUCCH/PUSCH) with the high priority uplink transmission (e.g., HP PUSCH) is resolved by cancelling the low priority uplink transmission scheduled in the first slot. However, in this example, as described above that for each slot in the remaining overlapping slots in which the two high priority scheduled uplink transmissions overlap, the UE 104 may resolve the collision between the high priority transmissions (e.g., according to the priority index in descending order: HARQ ACK, SR, CSI of high priority, CSI of low priority, and PUSCH), HP PUSCH in slot 2 may be canceled and since the low priority transmission scheduled in the second slot does not now overlap with any transmission (e.g., any transmission of the two or more scheduled uplink transmission with different priorities that overlap in at least one slot), the UE 104 transmits the low priority transmission scheduled in the second slot. Specifically, if the two LP transmissions are repetitive transmissions, then the UE 104 shall proceed as illustrated FIG. 9. However, if the two PUSCH are different (i.e., not repetitive) transmissions, then UE 104 shall not proceed as according to FIG. 9. As a result of first resolving the collision between HP PUCCH and HP PUSCH, no overlap exists between the LP channel and any HP channel.

Additionally or alternatively, UE 104 may determine that at least one high priority scheduled uplink transmission is involved in a collision in any of the slots, and if at least one of the high priority scheduled uplink transmissions is scheduled with repetition and scheduled by a DCI format in a PDCCH, then UE 104 may perform the collision resolution procedure for a first slot and then subsequent slots.

For example, in a first slot of the multiple slots (e.g., Slot 0) in which one of the high priority scheduled uplink transmissions is scheduled, UE 104 cancels one or more of any of the one or more low priority scheduled uplink transmissions and any of the at least two high priority scheduled uplink transmissions from the first slot that includes the one or more high priority scheduled repetitive uplink transmissions based on a determination that the at least one of the at least two high priority scheduled uplink transmissions is scheduled for repetitive uplink transmissions by the DCI in the PDCCH. As illustrated in FIG. 7, these canceled transmissions in Slot 0 are not illustrated for clarity. In this example, UE 104 may recognize the high priority scheduled uplink transmission in slot 0 (e.g., the first transmission of the high priority repetitive uplink transmissions) as scheduled by a DCI format in a PDCCH.

For each slot in the remaining slots in which one of the high priority scheduled uplink transmissions is scheduled, UE 104 may resolve the collision between low priority scheduled uplink transmissions, the high priority repetitive transmissions, and any other high priority scheduled uplink transmissions in the slot by configuring the high priority uplink repetition transmission in the slot as a high priority transmission that is not scheduled by a DCI format in a PDCCH. Accordingly, UE 104 may consider the high priority scheduled uplink repetition transmission in the remaining slots as a "high-layer" configured uplink transmission, and therefore UE 104 may not cancel a low priority scheduled uplink transmission that overlaps with the high priority transmission, unless UE 104 confirms that the high priority scheduled uplink transmission will be transmitted in this slot.

Additionally or alternatively, in an example of FIG. 7, in both slot 1 and slot 2, UE 104 may not cancel the low priority PUSCH/PUCCH transmission due to the high priority PUSCH transmissions in slot 1 and slot 2 being repetitions of the high priority PUSCH transmission in slot 0, and DCIs of each of these transmission being received at least one slot before. In slot 1 and slot 2, the high priority PUSCH is treated as an uplink transmission without a DCI format. When overlapping with other uplink transmissions occurs, UE 104 shall resolve the collision using the procedure described in FIG. 6. In particular, UE 104 may first resolve the collision between high priority HARQ-ACK and high priority PUSCH, which results in cancellation of the high priority PUSCH. Then since the HARQ-ACK does not overlap with the low priority scheduled uplink transmission, UE 104 may not cancel the low priority scheduled uplink transmission in slot 1 and slot 2. Therefore, UE 104 may configure the high priority PUSCH transmissions in slot 1 and slot 2 as PUSCH transmissions without a DCI format in the PDCCH.

Figure 11:
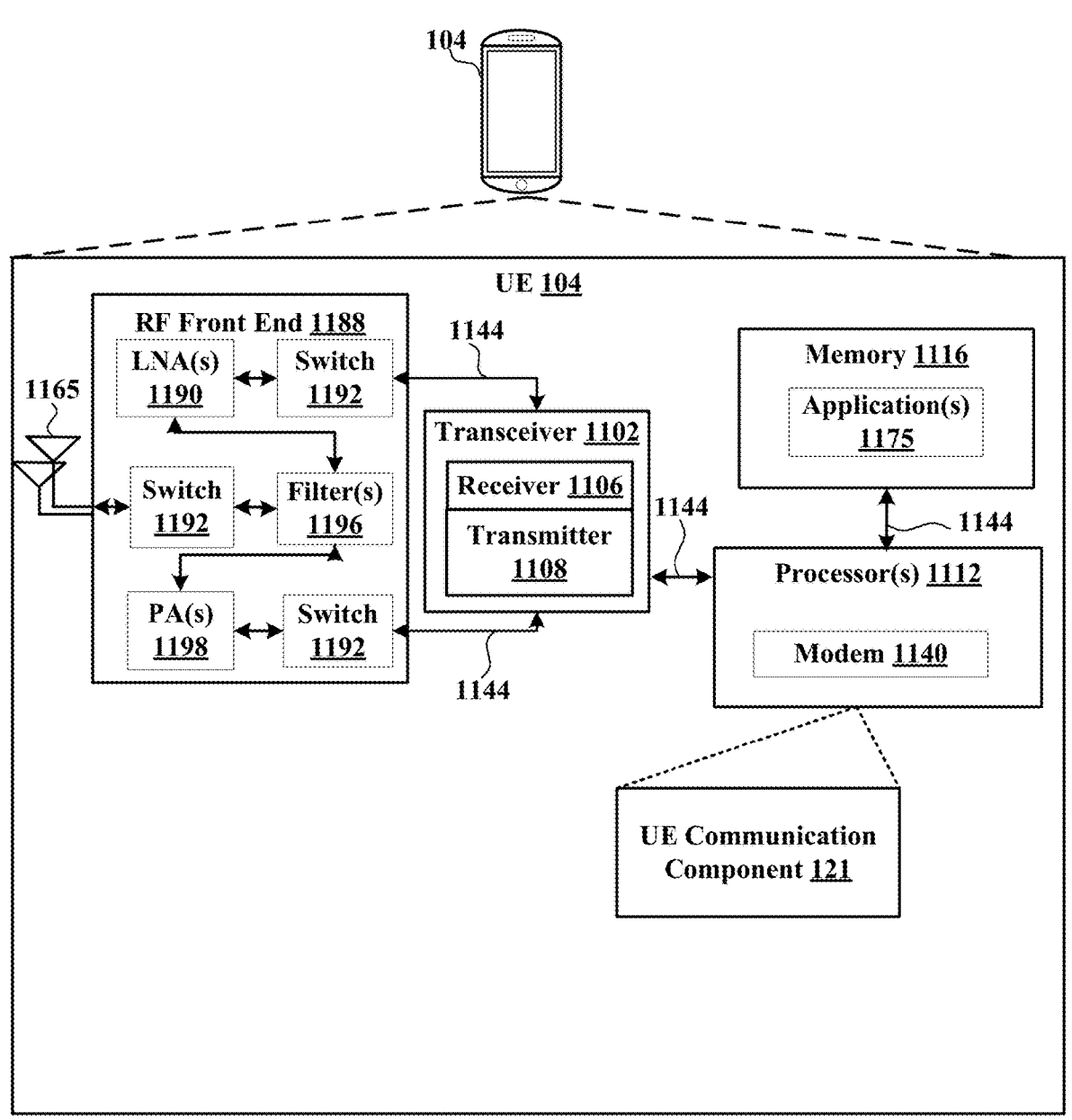
FIG. 11 is a block diagram of an example UE, in accordance with various aspects of the present disclosure.

Referring to FIG. 8, an example method 800 of wireless communication may be performed by the UE 104, which may include one or more components as discussed in FIG. 1, 4, or 11, and which may transfer data segments after performing a random-access channel (RACH) procedure as discussed above with regard to FIGS. 1-7.

At 802, method 800 includes identifying two or more scheduled uplink transmissions with different priorities that overlap in at least one slot, wherein at least one of the two or more uplink transmissions is scheduled for repetitive transmission across at least a first slot and a second slot. For example, in an aspect, the UE 104 may operate one or any combination of antennas 1165, RF front end 1188, transceiver 1102, processor 1112, memory 1116, modem 1140, or communication component 121 to identify two or more scheduled uplink transmissions with different priorities that overlap in at least one slot, wherein at least one of the two or more uplink transmissions is scheduled for repetitive transmission across at least a first slot and a second slot. Thus, the UE 104, antennas 1165, RF front end 1188, transceiver 1102, processor 1112, memory 1116, modem 1140, and communication component 121 may define the means for identifying two or more scheduled uplink transmissions with different priorities that overlap in at least one slot, wherein at least one of the two or more uplink transmissions is scheduled for repetitive transmission across at least a first slot and a second slot.

At 804, method 800 includes performing one or more collision resolution procedures in at least one of the first slot and the second slot for the two or more scheduled uplink transmissions with the different priorities that overlap in the at least one slot to resolve collisions for at least one of one or more low priority scheduled uplink transmissions of the two or more scheduled uplink transmissions and one or more high priority scheduled uplink transmissions of the two or more scheduled uplink transmissions. For example, in an aspect, the UE 104 may operate one or any combination of antennas 1165, RF front end 1188, transceiver 1102, processor 1112, memory 1116, modem 1140, or communication component 121 to perform one or more collision resolution procedures in at least one of the first slot and the second slot for the two or more scheduled uplink transmissions with the different priorities that overlap in the at least one slot to resolve collisions for at least one of one or more low priority scheduled uplink transmissions of the two or more scheduled uplink transmissions and one or more high priority scheduled uplink transmissions of the two or more scheduled uplink transmissions. Thus, the UE 104, antennas 1165, RF front end 1188, transceiver 1102, processor 1112, memory 1116, modem 1140, and UE communication component 121 may define the means for performing one or more collision resolution procedures in at least one of the first slot and the second slot for the two or more scheduled uplink transmissions with the different priorities that overlap in the at least one slot to resolve collisions for at least one of one or more low priority scheduled uplink transmissions of the two or more scheduled uplink transmissions and one or more high priority scheduled uplink transmissions of the two or more scheduled uplink transmissions.

In some implementations of method 800, the two or more scheduled uplink transmissions include multiple low priority scheduled uplink transmissions.

In some implementations of method 800, the UE communication component 121, such as in conjunction with transceiver 1102, processor 1112, memory 1116, or modem 1140, configured to perform the one or more collision resolution procedures further comprises determining whether any of the multiple low priority scheduled uplink transmissions correspond to a repetitive uplink transmission on a PUCCH; multiplexing the multiple low priority scheduled uplink transmissions based on the determination that none of the multiple low priority scheduled uplink transmissions correspond to the repetitive uplink transmission on the PUCCH; and cancelling at least one of the multiple low priority scheduled uplink transmissions using a priority hierarchy for uplink transmissions until none of the multiple low priority scheduled uplink transmissions overlap in any of the at least one slot based on the determination that at least one of the multiple low priority scheduled uplink transmissions correspond to the repetitive uplink transmission on the PUCCH.

In some implementations of method 800, the priority hierarchy indicates a priority associated with each uplink transmission type in a descending priority order including a HARQ ACK, SR, CSI of high priority, CSI of low priority, and PUSCH.

In some implementations of method 800, the UE communication component 121, such as in conjunction with transceiver 1102, processor 1112, memory 1116, or modem 1140, configured to perform the one or more collision resolution procedures further comprises determining whether the one or more low priority scheduled uplink transmissions of the two or more scheduled uplink transmissions overlap with the one or more high priority scheduled uplink transmissions of the two or more scheduled uplink transmissions in each slot, wherein the one or more high priority scheduled uplink transmissions are scheduled by a PDCCH; and cancelling the one or more low priority scheduled uplink transmissions based on a determination that the one or more low priority scheduled uplink transmissions of the two or more scheduled uplink transmissions overlap with the one or more high priority scheduled uplink transmissions of the two or more scheduled uplink transmissions.

In some implementations of method 800, the UE communication component 121, such as in conjunction with transceiver 1102, processor 1112, memory 1116, or modem 1140, configured to cancel the one or more low priority scheduled uplink transmissions further comprises cancelling the one or more low priority scheduled uplink transmissions at least one or both prior and subsequent to resolving a collision between multiple overlapping high priority scheduled uplink transmissions of the two or more scheduled uplink transmissions.

In some implementations of method 800, the UE communication component 121, such as in conjunction with transceiver 1102, processor 1112, memory 1116, or modem 1140, is configured to determine whether any of the multiple overlapping high priority scheduled uplink transmissions of the two or more scheduled uplink transmissions correspond to a repetitive uplink transmission on a PUCCH; and multiplex the multiple overlapping high priority scheduled uplink transmissions of the two or more scheduled uplink transmissions based on a determination that none of the multiple overlapping high priority scheduled uplink transmissions of the two or more scheduled uplink transmissions correspond to the repetitive uplink transmission on the PUCCH, wherein cancelling the one or more low priority scheduled uplink transmissions further comprises cancelling the one or more low priority scheduled uplink transmissions using a priority hierarchy for uplink transmissions based on a determination that any of the multiple overlapping high priority scheduled uplink transmissions of the two or more scheduled uplink transmissions correspond to the repetitive uplink transmission on the PUCCH.

In some implementations of method 800, the UE communication component 121, such as in conjunction with transceiver 1102, processor 1112, memory 1116, or modem 1140, configured to perform the one or more collision resolution procedures further comprises determining whether at least two high priority scheduled uplink transmissions of the two or more scheduled uplink transmissions overlap in more than one slot of the at least one slot; determining whether any of the one or more low priority scheduled uplink transmissions of the two or more scheduled uplink transmissions overlaps with any of the at least two high priority scheduled uplink transmissions of the two or more scheduled uplink transmissions in the first slot, wherein any of the at least two high priority scheduled uplink transmissions are scheduled by a physical downlink control channel (PDCCH) in any of the at least one slot; and cancelling any of the one or more low priority scheduled uplink transmissions from the first slot based on a determination that any of the one or more low priority scheduled uplink transmissions of the two or more scheduled uplink transmissions overlaps with any of the at least two high priority scheduled uplink transmissions of the two or more scheduled uplink transmissions.

In some implementations of method 800, the UE communication component 121, such as in conjunction with transceiver 1102, processor 1112, memory 1116, or modem 1140, is configured to determine whether each of the at least two high priority scheduled uplink transmissions are scheduled by the PDCCH in any of the at least one slot, and wherein cancelling the one or more low priority scheduled uplink transmissions from the first slot further comprises cancelling the one or more low priority scheduled uplink transmissions from the first slot upon reception of a DCI for one of the at least two high priority scheduled uplink transmissions based on a determination that each of the at least two high priority scheduled uplink transmissions are scheduled by the PDCCH in any of the at least one slot.

In some implementations of method 800, the communicating component 121, such as in conjunction with transceiver 1102, processor 1112, memory 1116, or modem 1140, is configured to cancel any of the at least two high priority scheduled uplink transmissions of the two or more scheduled uplink transmissions with lower priority types using a priority hierarchy for each slot subsequent to the first slot that includes remaining overlapping high priority scheduled uplink transmissions of the at least two high priority scheduled uplink transmissions of the two or more scheduled uplink transmissions, wherein any remaining high priority scheduled uplink transmission of the at least two high priority scheduled uplink transmissions does not overlap; determine whether any of the one or more low priority scheduled uplink transmissions of the two or more scheduled uplink transmissions overlap any remaining high priority scheduled uplink transmission for the each slot subsequent to the first slot; and cancel any of the one or more low priority scheduled uplink transmission of the two or more scheduled uplink transmission for the each slot subsequent to the first slot based on a determination that any of the one or more low priority scheduled uplink transmissions of the two or more scheduled uplink transmissions overlap any remaining high priority scheduled uplink transmission for the each slot subsequent to the first slot.

In some implementations of method 800, the UE communication component 121, such as in conjunction with transceiver 1102, processor 1112, memory 1116, or modem 1140, configured to perform the one or more collision resolution procedures further comprises determining whether at least two high priority scheduled uplink transmissions of the two or more scheduled uplink transmissions overlap in one or more slots of the at least one slot; and determining whether at least one of the at least two high priority scheduled uplink transmissions is scheduled for repetitive uplink transmissions by a DCI in a PDCCH based on a determination that the at least two high priority scheduled uplink transmissions of the two or more scheduled uplink transmissions overlap in the one or more slots of the at least one slot.

In some implementations of method 800, the UE communication component 121, such as in conjunction with transceiver 1102, processor 1112, memory 1116, or modem 1140, is configured to cancelling one or more of any of the one or more low priority scheduled uplink transmissions and any of the at least two high priority scheduled uplink transmissions from the first slot that includes the repetitive uplink transmissions based on a determination that the at least one of the at least two high priority scheduled uplink transmissions is scheduled for repetitive uplink transmissions by the DCI in the PDCCH.

In some implementations of method 800, the UE communication component 121, such as in conjunction with transceiver 1102, processor 1112, memory 1116, or modem 1140, is configured to resolve one or more collisions between any of the one or more low priority scheduled uplink transmissions and any of the at least two high priority scheduled uplink transmissions for each slot subsequent to the first slot, wherein the one or more high priority scheduled uplink transmissions in any slot subsequent to the first slot corresponding to a repetitive transmission are configured as a high priority scheduled uplink transmission that is not scheduled by the DCI in the PDCCH.

In some implementations of method 800, the UE communication component 121, such as in conjunction with transceiver 1102, processor 1112, memory 1116, or modem 1140, is configured to forgo cancellation of any of the one or more low priority scheduled uplink transmissions that overlap with the high priority scheduled uplink transmission of the one or more high priority scheduled uplink transmissions until confirmation that the high priority scheduled uplink transmission of the one or more high priority scheduled uplink transmissions is transmitted in the slot subsequent to the first slot.

Referring to FIG. 9, an example method 900 of wireless communication may be performed by the UE 104, which may include one or more components as discussed in FIG. 1, 4, or 11, and which may transfer data segments after performing a RACH procedure as discussed above with regard to FIGS. 1-7.

At 902, method 900 includes identifying two or more scheduled uplink transmissions with different priorities that overlap in at least one slot, wherein at least one of the two or more uplink transmissions comprise a low priority uplink transmission scheduled for repetitive transmission across at least a first slot and a second slot and further comprise one or more high priority uplink transmissions scheduled in the first slot. For example, in an aspect, the UE 104 may operate one or any combination of antennas 1165, RF front end 1188, transceiver 1102, processor 1112, memory 1116, modem 1140, or communication component 121 to identify two or more scheduled uplink transmissions with different priorities that overlap in at least one slot, wherein at least one of the two or more uplink transmissions comprise a low priority uplink transmission scheduled for repetitive transmission across at least a first slot and a second slot and further comprise one or more high priority uplink transmissions scheduled in the first slot. Thus, the UE 104, antennas 1165, RF front end 1188, transceiver 1102, processor 1112, memory 1116, modem 1140, and communication component 121 may define the means for identifying two or more scheduled uplink transmissions with different priorities that overlap in at least one slot, wherein at least one of the two or more uplink transmissions comprise a low priority uplink transmission scheduled for repetitive transmission across at least a first slot and a second slot and further comprise one or more high priority uplink transmissions scheduled in the first slot.

At 904, method 900 includes performing one or more collision resolution procedures in at least one of the first slot to resolve a collision of the low priority uplink transmission with the one or more high priority uplink transmissions scheduled in the first slot by cancelling the low priority uplink transmission scheduled in the first slot. For example, in an aspect, the UE 104 may operate one or any combination of antennas 1165, RF front end 1188, transceiver 1102, processor 1112, memory 1116, modem 1140, or communication component 121 to perform one or more collision resolution procedures in at least one of the first slot to resolve a collision of the low priority uplink transmission with the one or more high priority uplink transmissions scheduled in the first slot by cancelling the low priority uplink transmission scheduled in the first slot. Thus, the UE 104, antennas 1165, RF front end 1188, transceiver 1102, processor 1112, memory 1116, modem 1140, and communication component 121 may define the means for performing one or more collision resolution procedures in at least one of the first slot to resolve a collision of the low priority uplink transmission with the one or more high priority uplink transmissions scheduled in the first slot by cancelling the low priority uplink transmission scheduled in the first slot.

At 906, method 900 includes transmitting the low priority transmission scheduled in the second slot responsive to the low priority uplink transmission not overlapping with any transmission of the two or more scheduled uplink transmissions with different priorities that overlap in the at least one slot. For example, in an aspect, the UE 104 may operate one or any combination of antennas 1165, RF front end 1188, transceiver 1102, processor 1112, memory 1116, modem 1140, or communication component 121 to transmit the low priority transmission scheduled in the second slot responsive to the low priority uplink transmission not overlapping with any transmission of the two or more scheduled uplink transmissions with different priorities that overlap in the at least one slot. Thus, the UE 104, antennas 1165, RF front end 1188, transceiver 1102, processor 1112, memory 1116, modem 1140, and communication component 121 may define the means for transmitting the low priority transmission scheduled in the second slot responsive to the low priority uplink transmission not overlapping with any transmission of the two or more scheduled uplink transmissions with different priorities that overlap in the at least one slot.

In some implementations of method 900, the two or more scheduled uplink transmissions include multiple low priority scheduled uplink transmissions, and the UE communication component 121, such as in conjunction with transceiver 1102, processor 1112, memory 1116, or modem 1140, configured to perform the one or more collision resolution procedures further comprises determining whether any of the multiple low priority scheduled uplink transmissions correspond to a repetitive uplink transmission on a physical uplink control channel (PUCCH); multiplexing the multiple low priority scheduled uplink transmissions based on the determination that none of the multiple low priority scheduled uplink transmissions correspond to the repetitive uplink transmission on the PUCCH; and cancelling at least one of the multiple low priority scheduled uplink transmissions using a priority hierarchy for uplink transmissions until none of the multiple low priority scheduled uplink transmissions overlap in any of the at least one slot based on the determination that at least one of the multiple low priority scheduled uplink transmissions correspond to the repetitive uplink transmission on the PUCCH.

In some implementations of method 900, the priority hierarchy indicates a priority associated with each uplink transmission type in a descending priority order including a HARQ ACK, SR, CSI of high priority, CSI of low priority, and PUSCH.

Referring to FIG. 10, an example method 1000 of wireless communication may be performed by the UE 104, which may include one or more components as discussed in FIG. 1, 4, or 11, and which may transfer data segments after performing a RACH procedure as discussed above with regard to FIGS. 1-7.

At 1002, method 1000 includes identifying a plurality of scheduled uplink transmissions that overlap in at least a first slot and a second slot, wherein the plurality of uplink transmissions comprises a first high priority uplink transmission scheduled for repetitive transmission across at least the first slot and the second slot and further comprises one or more additional uplink transmissions scheduled in the first slot and two or more additional uplink transmissions scheduled in the second slot, wherein the two or more additional uplink transmissions scheduled in the second slot comprise at least a low priority uplink transmission and a second high priority uplink transmission. For example, in an aspect, the UE 104 may operate one or any combination of antennas 1165, RF front end 1188, transceiver 1102, processor 1112, memory 1116, modem 1140, or communication component 121 to identify a plurality of scheduled uplink transmissions that overlap in at least a first slot and a second slot, wherein the plurality of uplink transmissions comprises a first high priority uplink transmission scheduled for repetitive transmission across at least the first slot and the second slot and further comprises one or more additional uplink transmissions scheduled in the first slot and two or more additional uplink transmissions scheduled in the second slot, wherein the two or more additional uplink transmissions scheduled in the second slot comprise at least a low priority uplink transmission and a second high priority uplink transmission. Thus, the UE 104, antennas 1165, RF front end 1188, transceiver 1102, processor 1112, memory 1116, modem 1140, and communication component 121 may define the means for identifying a plurality of scheduled uplink transmissions that overlap in at least a first slot and a second slot, wherein the plurality of uplink transmissions comprises a first high priority uplink transmission scheduled for repetitive transmission across at least the first slot and the second slot and further comprises one or more additional uplink transmissions scheduled in the first slot and two or more additional uplink transmissions scheduled in the second slot, wherein the two or more additional uplink transmissions scheduled in the second slot comprise at least a low priority uplink transmission and a second high priority uplink transmission.

At 1004, method 1000 includes performing a first collision resolution procedure in the first slot and performing a second collision resolution procedure in the second slot, the second collision resolution procedure being independent of the first collision resolution procedure. For example, in an aspect, the UE 104 may operate one or any combination of antennas 1165, RF front end 1188, transceiver 1102, processor 1112, memory 1116, modem 1140, or communication component 121 to perform a first collision resolution procedure in the first slot and performing a second collision resolution procedure in the second slot, the second collision resolution procedure being independent of the first collision resolution procedure. Thus, the UE 104, antennas 1165, RF front end 1188, transceiver 1102, processor 1112, memory 1116, modem 1140, and communication component 121 may define the means for performing a first collision resolution procedure in the first slot and performing a second collision resolution procedure in the second slot, the second collision resolution procedure being independent of the first collision resolution procedure.

For example, in some implementations of method 1000, where UE 104 and/or communication component 121 only cancels the low priority scheduled uplink transmission in the first slot, but not in the second slot, the UE 104 and/or communication component 121 may proceed as illustrated in FIG. 9, where the first and second low priority scheduled uplink transmissions (LP PUCCH/PUSCHs in slots 1 and 2) represent a low priority uplink transmission scheduled for repetitive transmission across at least a first slot and a second slot. The UE 104 and/or communication component 121 can identify two or more scheduled uplink transmissions with different priorities that overlap in at least one slot, illustrated in FIG. 7 as $1^{st}$ LP PUCCH/PUSCH and HP PUSCH that overlap, at least partially, in slot 1. As illustrated in FIG. 7, the two or more scheduled uplink transmissions with different priorities that overlap in the at least one slot include the $1^{st}$ and $2^{nd}$ LP PUCCH/PUSCH, as well as the HP PUSCH that overlaps with the $1^{st}$ and $2^{nd}$ LP PUCCH/PUSCH in both slots 1 and 2. By performing one or more collision resolution procedures, as discussed elsewhere herein, the collision of the low priority uplink transmission (e.g., $1^{st}$ LP PUCCH/PUSCH) with the high priority uplink transmission (e.g., HP PUSCH) is resolved by cancelling the low priority uplink transmission scheduled in the first slot. However, in this example, since the low priority transmission scheduled in the second slot does not overlap with any transmission (e.g., any transmission of the two or more scheduled uplink transmission with different priorities that overlap in at least one slot), the UE 104 transmits the low priority transmission scheduled in the second slot.

In some implementations of method 1000, the UE communication component 121, such as in conjunction with transceiver 1102, processor 1112, memory 1116, or modem 1140, configured to perform the first collision resolution procedure in the first slot and performing the second collision resolution procedure in the second slot further comprises determining whether one or more low priority scheduled uplink transmissions of the plurality scheduled uplink transmissions overlap with the one or more high priority scheduled uplink transmissions of the two or more additional scheduled uplink transmissions in each slot, wherein the one or more high priority scheduled uplink transmissions are scheduled by a physical downlink control channel (PDCCH); and cancelling the one or more low priority scheduled uplink transmissions based on a determination that the one or more low priority scheduled uplink transmissions of the two or more additional scheduled uplink transmissions overlap with the one or more high priority scheduled uplink transmissions of the two or more additional scheduled uplink transmissions.

In some implementations of method 1000, the UE communication component 121, such as in conjunction with transceiver 1102, processor 1112, memory 1116, or modem 1140, configured to cancel the one or more low priority uplink transmissions further comprises cancelling the one or more low priority uplink transmissions at least one or both prior and subsequent to resolving a collision between multiple overlapping high priority uplink transmissions of the plurality of uplink transmissions.

In some implementations of method 1000, the UE communication component 121, such as in conjunction with transceiver 1102, processor 1112, memory 1116, or modem 1140, configured to perform the first collision resolution procedure in the first slot further comprises determining whether at least two high priority uplink transmissions of the plurality of uplink transmissions overlap in more than one of the first slot and the second slot; determining whether any of one or more low priority uplink transmissions of the plurality of uplink transmissions overlaps with any of the at least two high priority uplink transmissions of the plurality of uplink transmissions in the first slot, wherein any of the at least two high priority uplink transmissions are scheduled by a physical downlink control channel (PDCCH); and cancelling any of the one or more low priority uplink transmissions from the first slot based on a determination that any of the one or more low priority uplink transmissions of the plurality of uplink transmissions overlaps with any of the at least two high priority uplink transmissions of the plurality of uplink transmissions.

In some implementations of method 1000, the UE communication component 121, such as in conjunction with transceiver 1102, processor 1112, memory 1116, or modem 1140, is configured to determine whether each of the at least two high priority uplink transmissions are scheduled by the PDCCH, and wherein cancelling the one or more low priority uplink transmissions from the first slot further comprises cancelling the one or more low priority uplink transmissions from the first slot upon reception of a downlink control information (DCI) for one of the at least two high priority uplink transmissions based on a determination that each of the at least two high priority uplink transmissions are scheduled by the PDCCH.

In some implementations of method 1000, the UE communication component 121, such as in conjunction with transceiver 1102, processor 1112, memory 1116, or modem 1140, configured to perform the second collision resolution procedure in the second slot further comprises cancelling any of the at least two high priority uplink transmissions of the plurality of uplink transmissions with lower priority types using a priority hierarchy for the second slot that includes remaining overlapping high priority uplink transmissions of the at least two high priority uplink transmissions of the plurality of uplink transmissions, wherein any remaining high priority uplink transmission of the at least two high priority uplink transmissions does not overlap; determining whether any of the one or more low priority uplink transmissions of the plurality of uplink transmissions overlap any remaining high priority uplink transmission for the second slot; and cancelling any of the one or more low priority uplink transmissions of the plurality of uplink transmission for the second slot based on a determination that any of the one or more low priority uplink transmissions of the plurality of uplink transmissions overlap any remaining high priority uplink transmission for the second slot.

In some implementations of method 1000, the UE communication component 121, such as in conjunction with transceiver 1102, processor 1112, memory 1116, or modem 1140, configured to perform the first collision resolution procedure in the first slot and performing the second collision resolution procedure in the second slot further comprises determining whether at least two high priority uplink transmissions of the plurality of uplink transmissions overlap in one or more slots of the at least one slot; determining whether at least one of the at least two high priority uplink transmissions is scheduled for repetitive uplink transmissions by a downlink control information (DCI) in a physical downlink control channel (PDCCH) based on a determination that the at least two high priority scheduled uplink transmissions of the two or more additional scheduled uplink transmissions overlap in the one or more slots of the at least one slot; and cancelling one or more of any of the one or more low priority uplink transmissions and any of the at least two high priority uplink transmissions from the first slot that includes the repetitive uplink transmissions based on a determination that the at least one of the at least two high priority uplink transmissions is scheduled for repetitive uplink transmissions by the DCI in the PDCCH.

In some implementations of method 1000, the UE communication component 121, such as in conjunction with transceiver 1102, processor 1112, memory 1116, or modem 1140, configured to resolve one or more collisions between any of the one or more low priority uplink transmissions and any of the at least two high priority uplink transmissions for the second slot, wherein the at least two high priority uplink transmissions in the second slot corresponding to a repetitive transmission are configured as a high priority uplink transmission that is not scheduled by the DCI in the PDCCH.

In some implementations of method 1000, the UE communication component 121, such as in conjunction with transceiver 1102, processor 1112, memory 1116, or modem 1140, is configured to forgo cancellation of any of the one or more low priority uplink transmissions that overlap with the first high priority uplink transmission of the at least two high priority uplink transmissions until confirmation that the first high priority uplink transmission of the at least two high priority uplink transmissions is transmitted in the second slot.

In some implementations of method 1000, the UE communication component 121, such as in conjunction with transceiver 1102, processor 1112, memory 1116, or modem 1140, configured to perform the first collision resolution procedure in the first slot and performing the second collision resolution procedure in the second slot further comprises performing the first collision resolution procedure in the first slot independently of performing the second collision resolution procedure in the second slot.

Referring to FIG. 11, one example of an implementation of UE 104 may include a variety of components, some of which have already been described above and are described further herein, including components such as one or more processors 1112 and memory 1116 and transceiver 1102 in communication via one or more buses 1144, which may operate in conjunction with modem 1140 and/or UE communication component 121 configured for collision resolution for overlapping uplink transmissions with different priorities.

In an aspect, the one or more processors 1112 can include a modem 1140 and/or can be part of the modem 1140 that uses one or more modem processors. Thus, the various functions related to configuration component 198 may be included in modem 1140 and/or processors 1112 and, in an aspect, can be executed by a single processor, while in other aspects, different ones of the functions may be executed by a combination of two or more different processors. For example, in an aspect, the one or more processors 1112 may include any one or any combination of a modem processor, or a baseband processor, or a digital signal processor, or a transmit processor, or a receiver processor, or a transceiver processor associated with transceiver 1102. In other aspects, some of the features of the one or more processors 1112 and/or modem 1140 associated with configuration component 198 may be performed by transceiver 1102.

Also, memory 1116 may be configured to store data used herein and/or local versions of applications 1175 or communicating component 1142 and/or one or more of its subcomponents being executed by at least one processor 1112. Memory 1116 can include any type of computer-readable medium usable by a computer or at least one processor 1112, such as random access memory (RAM), read only memory (ROM), tapes, magnetic discs, optical discs, volatile memory, non-volatile memory, and any combination thereof. In an aspect, for example, memory 1116 may be a non-transitory computer-readable storage medium that stores one or more computer-executable codes defining UE communication component 121 and/or one or more of its subcomponents, and/or data associated therewith, when UE 104 is operating at least one processor 1112 to execute UE communication component 121 and/or one or more of its subcomponents.

Transceiver 1102 may include at least one receiver 1106 and at least one transmitter 1108. Receiver 1106 may include hardware and/or software executable by a processor for receiving data, the code comprising instructions and being stored in a memory (e.g., computer-readable medium). Receiver 1106 may be, for example, a radio frequency (RF) receiver. In an aspect, receiver 1106 may receive signals transmitted by at least one base station 102. Additionally, receiver 1106 may process such received signals, and also may obtain measurements of the signals, such as, but not limited to, Ec/Io, signal-to-noise ratio (SNR), reference signal received power (RSRP), received signal strength indicator (RSSI), etc. Transmitter 1108 may include hardware and/or software executable by a processor for transmitting data, the code comprising instructions and being stored in a memory (e.g., computer-readable medium). A suitable example of transmitter 1108 may including, but is not limited to, an RF transmitter.

Moreover, in an aspect, UE 104 may include RF front end 1188, which may operate in communication with one or more antennas 1165 and transceiver 1102 for receiving and transmitting radio transmissions, for example, wireless communications transmitted by at least one base station 102 or wireless transmissions transmitted by UE 104. The one or more antennas 1165 may include one or more antenna panels and/or sub-arrays, such as may be used for beamforming. RF front end 1188 may be connected to one or more antennas 1165 and can include one or more low-noise amplifiers (LNAs) 1190, one or more switches 1192, one or more power amplifiers (PAs) 1198, and one or more filters 1196 for transmitting and receiving RF signals.

In an aspect, LNA 1190 can amplify a received signal at a desired output level. In an aspect, each LNA 1190 may have a specified minimum and maximum gain values. In an aspect, RF front end 1188 may use one or more switches 1192 to select a particular LNA 1190 and its specified gain value based on a desired gain value for a particular application.

Further, for example, one or more PA(s) 1198 may be used by RF front end 1188 to amplify a signal for an RF output at a desired output power level. In an aspect, each PA 1198 may have specified minimum and maximum gain values. In an aspect, RF front end 1188 may use one or more switches 1192 to select a particular PA 1198 and its specified gain value based on a desired gain value for a particular application.

Also, for example, one or more filters 1196 can be used by RF front end 1188 to filter a received signal to obtain an input RF signal. Similarly, in an aspect, for example, a respective filter 1196 can be used to filter an output from a respective PA 1198 to produce an output signal for transmission. In an aspect, each filter 1196 can be connected to a specific LNA 1190 and/or PA 1198. In an aspect, RF front end 1188 can use one or more switches 1192 to select a transmit or receive path using a specified filter 1196, LNA 1190, and/or PA 1198, based on a configuration as specified by transceiver 1102 and/or processor 1112.

As such, transceiver 1102 may be configured to transmit and receive wireless signals through one or more antennas 1165 via RF front end 1188. In an aspect, transceiver may be tuned to operate at specified frequencies such that UE 104 can communicate with, for example, one or more base stations 102 or one or more cells associated with one or more base stations 102. In an aspect, for example, modem 1140 can configure transceiver 1102 to operate at a specified frequency and power level based on the UE configuration of the UE 104 and the communication protocol used by modem 1140.

In an aspect, modem 1140 can be a multiband-multimode modem, which can process digital data and communicate with transceiver 1102 such that the digital data is sent and received using transceiver 1102. In an aspect, modem 1140 can be multiband and be configured to support multiple frequency bands for a specific communications protocol. In an aspect, modem 1140 can be multimode and be configured to support multiple operating networks and communications protocols. In an aspect, modem 1140 can control one or more components of UE 104 (e.g., RF front end 1188, transceiver 1102) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 1112 may correspond to one or more of the processors described in connection with the UE in FIG. 3. Similarly, the memory 1116 may correspond to the memory described in connection with the UE in FIG. 3.

Figure 12:
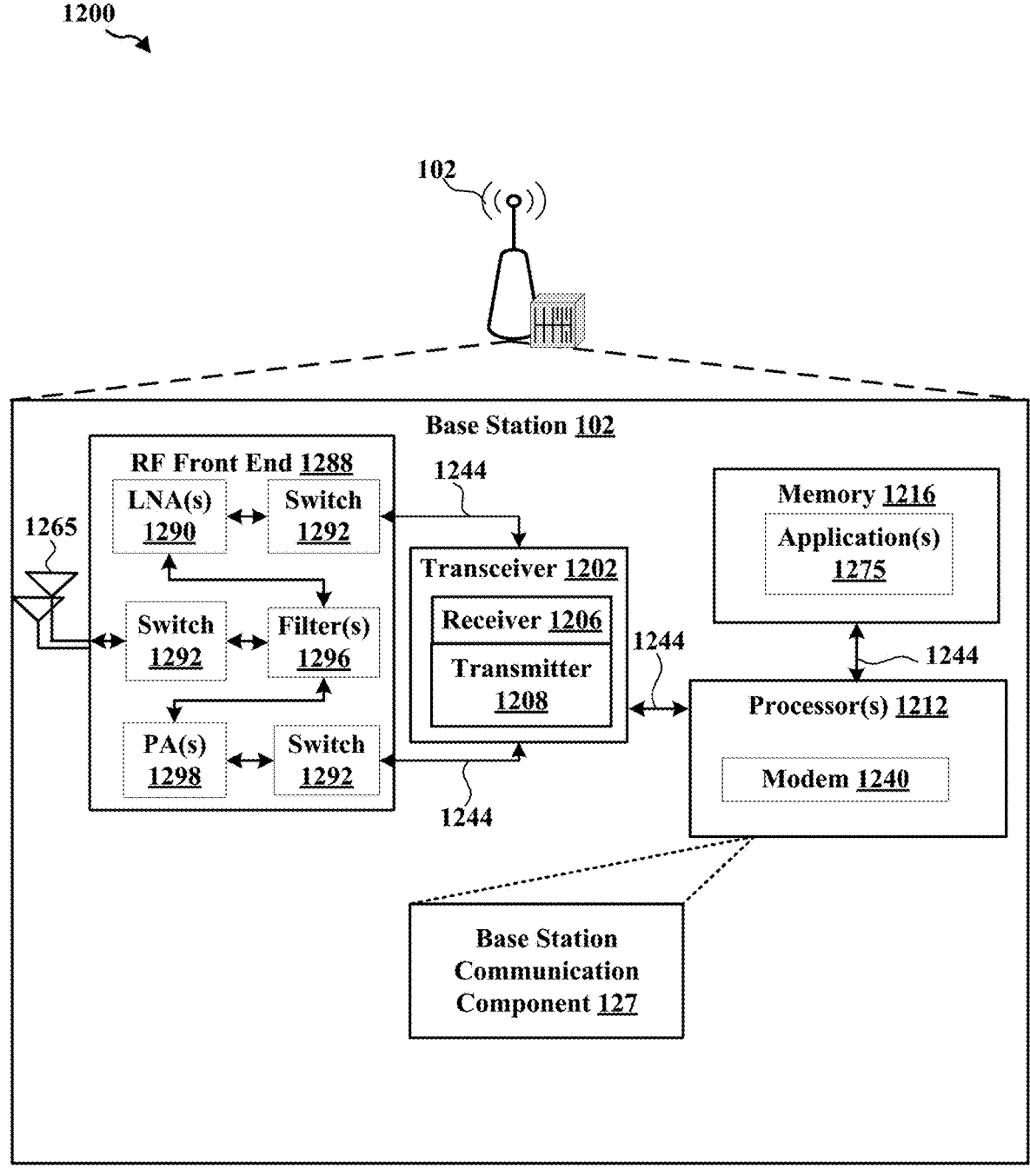
FIG. 12 is a block diagram of an example base station, in accordance with various aspects of the present disclosure.

Referring to FIG. 12, one example of an implementation of base station 102 (e.g., a base station 102, as described above) may include a variety of components, some of which have already been described above, but including components such as one or more processors 1212 and memory 1216 and transceiver 1202 in communication via one or more buses 1244, which may operate in conjunction with modem 1240 and base station communication component 127 configured to transfer data segments after performing a RACH procedure.

The transceiver 1202, receiver 1206, transmitter 1208, one or more processors 1212, memory 1216, applications 1275, buses 1244, RF front end 1288, LNAs 1290, switches 1292, filters 1296, PAs 1298, and one or more antennas 1265 may be the same as or similar to the corresponding components of UE 104, as described above, but configured or otherwise programmed for base station operations as opposed to UE operations.

In an aspect, the processor(s) 1212 may correspond to one or more of the processors described in connection with the base station in FIG. 3. Similarly, the memory 1216 may correspond to the memory described in connection with the base station in FIG. 3.

Some Further Example Clauses

Implementation examples are described in the following numbered clauses:

1. A method of wireless communication at a user equipment (UE), comprising:

identifying two or more scheduled uplink transmissions with different priorities that overlap in at least one slot, wherein at least one of the two or more uplink transmissions comprise a low priority uplink transmission scheduled for repetitive transmission across at least a first slot and a second slot and further comprise one or more high priority uplink transmissions scheduled in the first slot;

performing one or more collision resolution procedures in the first slot to resolve a collision of the low priority uplink transmission with the one or more high priority uplink transmissions scheduled in the first slot by cancelling the low priority uplink transmission scheduled in the first slot; and transmitting the low priority uplink transmission scheduled in the second slot responsive to the low priority uplink transmission not overlapping with any transmission of the two or more scheduled uplink transmissions with different priorities that overlap in the at least one slot.

2. The method of any preceding clause, wherein the two or more scheduled uplink transmissions include multiple low priority scheduled uplink transmissions, and wherein performing the one or more collision resolution procedures further comprises:

determining whether any of the multiple low priority scheduled uplink transmissions correspond to a repetitive uplink transmission on a physical uplink control channel (PUCCH);

multiplexing the multiple low priority scheduled uplink transmissions based on the determination that none of the multiple low priority scheduled uplink transmissions correspond to the repetitive uplink transmission on the PUCCH; and cancelling at least one of the multiple low priority scheduled uplink transmissions using a priority hierarchy for uplink transmissions until none of the multiple low priority scheduled uplink transmissions overlap in any of the at least one slot based on the determination that at least one of the multiple low priority scheduled uplink transmissions correspond to the repetitive uplink transmission on the PUCCH.

3. The method of any preceding clause, wherein the priority hierarchy indicates a priority associated with each uplink transmission type in a descending priority order including a hybrid access request (HARQ) acknowledgement (ACK), scheduling request (SR), channel state information (CSI) of high priority, CSI of low priority, and physical uplink shared channel (PUSCH).

4. An apparatus for wireless communication at a user equipment (UE), comprising:

a transceiver;

a memory; and one or more processors coupled with the transceiver and the memory, wherein the one or more processors and the memory are configured to: identify two or more scheduled uplink transmissions with different priorities that overlap in at least one slot, wherein at least one of the two or more uplink transmissions comprise a low priority uplink transmission scheduled for repetitive transmission across at least a first slot and a second slot and further comprise one or more high priority uplink transmissions scheduled in the first slot;

perform one or more collision resolution procedures in at least one of the first slot to resolve a collision of the low priority uplink transmission with the one or more high priority uplink transmissions scheduled in the first slot by cancelling the low priority uplink transmission scheduled in the first slot; and transmit the low priority uplink transmission scheduled in the second slot responsive to the low priority uplink transmission not overlapping with any transmission of the two or more scheduled uplink transmissions with different priorities that overlap in the at least one slot.

5. The apparatus of any preceding clause, wherein the two or more scheduled uplink transmissions include multiple low priority scheduled uplink transmissions, and wherein the one or more processors configured to perform the one or more collision resolution procedures are further configured to:

determine whether any of the multiple low priority scheduled uplink transmissions correspond to a repetitive uplink transmission on a physical uplink control channel (PUCCH);

multiplex the multiple low priority scheduled uplink transmissions based on the determination that none of the multiple low priority scheduled uplink transmissions correspond to the repetitive uplink transmission on the PUCCH; and cancel at least one of the multiple low priority scheduled uplink transmissions using a priority hierarchy for uplink transmissions until none of the multiple low priority scheduled uplink transmissions overlap in any of the at least one slot based on the determination that at least one of the multiple low priority scheduled uplink transmissions correspond to the repetitive uplink transmission on the PUCCH.

6. The apparatus of any preceding clause, wherein the priority hierarchy indicates a priority associated with each uplink transmission type in a descending priority order including a hybrid access request (HARQ) acknowledgement (ACK), scheduling request (SR), channel state information (CSI) of high priority, CSI of low priority, and physical uplink shared channel (PUSCH).

7. An apparatus for wireless communication at a user equipment (UE), comprising:

means for identifying two or more scheduled uplink transmissions with different priorities that overlap in at least one slot, wherein at least one of the two or more uplink transmissions comprise a low priority uplink transmission scheduled for repetitive transmission across at least a first slot and a second slot and further comprise one or more high priority uplink transmissions scheduled in the first slot;

means for performing one or more collision resolution procedures in at least one of the first slot to resolve a collision of the low priority uplink transmission with the one or more high priority uplink transmissions scheduled in the first slot by cancelling the low priority uplink transmission scheduled in the first slot; and means for transmitting the low priority uplink transmission scheduled in the second slot responsive to the low priority uplink transmission not overlapping with any transmission of the two or more scheduled uplink transmissions with different priorities that overlap in the at least one slot.

8. The apparatus of any preceding clause, wherein the two or more scheduled uplink transmissions include multiple low priority scheduled uplink transmissions, and wherein means for performing the one or more collision resolution procedures further comprises:

means for determining whether any of the multiple low priority scheduled uplink transmissions correspond to a repetitive uplink transmission on a physical uplink control channel (PUCCH);

means for multiplexing the multiple low priority scheduled uplink transmissions based on the determination that none of the multiple low priority scheduled uplink transmissions correspond to the repetitive uplink transmission on the PUCCH; and means for cancelling at least one of the multiple low priority scheduled uplink transmissions using a priority hierarchy for uplink transmissions until none of the multiple low priority scheduled uplink transmissions overlap in any of the at least one slot based on the determination that at least one of the multiple low priority scheduled uplink transmissions correspond to the repetitive uplink transmission on the PUCCH.

9. The apparatus of any preceding clause, wherein the priority hierarchy indicates a priority associated with each uplink transmission type in a descending priority order including a hybrid access request (HARQ) acknowledgement (ACK), scheduling request (SR), channel state information (CSI) of high priority, CSI of low priority, and physical uplink shared channel (PUSCH).

10. A non-transitory computer-readable medium at a user equipment (UE), comprising code executable by one or more processors to:

identify two or more scheduled uplink transmissions with different priorities that overlap in at least one slot, wherein at least one of the two or more uplink transmissions comprise a low priority uplink transmission scheduled for repetitive transmission across at least a first slot and a second slot and further comprise one or more high priority uplink transmissions scheduled in the first slot;

perform one or more collision resolution procedures in at least one of the first slot to resolve a collision of the low priority uplink transmission with the one or more high priority uplink transmissions scheduled in the first slot by cancelling the low priority uplink transmission scheduled in the first slot; and transmit the low priority uplink transmission scheduled in the second slot responsive to the low priority uplink transmission not overlapping with any transmission of the two or more scheduled uplink transmissions with different priorities that overlap in the at least one slot.

11. The non-transitory computer-readable medium of any preceding clause, wherein the two or more scheduled uplink transmissions include multiple low priority scheduled uplink transmissions, and wherein the one or more processors configured to perform the one or more collision resolution procedures are further configured to:

determine whether any of the multiple low priority scheduled uplink transmissions correspond to a repetitive uplink transmission on a physical uplink control channel (PUCCH);

multiplex the multiple low priority scheduled uplink transmissions based on the determination that none of the multiple low priority scheduled uplink transmissions correspond to the repetitive uplink transmission on the PUCCH; and cancel at least one of the multiple low priority scheduled uplink transmissions using a priority hierarchy for uplink transmissions until none of the multiple low priority scheduled uplink transmissions overlap in any of the at least one slot based on the determination that at least one of the multiple low priority scheduled uplink transmissions correspond to the repetitive uplink transmission on the PUCCH.

12. The non-transitory computer-readable medium of any preceding clause, wherein the priority hierarchy indicates a priority associated with each uplink transmission type in a descending priority order including a hybrid access request (HARQ) acknowledgement (ACK), scheduling request (SR), channel state information (CSI) of high priority, CSI of low priority, and physical uplink shared channel (PUSCH).

13. A method of wireless communication at a user equipment (UE), comprising:

identifying a plurality of uplink transmissions that overlap in at least a first slot and a second slot, wherein the plurality of uplink transmissions comprises a first high priority uplink transmission scheduled for repetitive transmission across at least the first slot and the second slot and further comprises one or more additional uplink transmissions scheduled in the first slot and two or more additional uplink transmissions scheduled in the second slot, wherein the two or more additional uplink transmissions scheduled in the second slot comprise at least a low priority uplink transmission and a second high priority uplink transmission; and performing a first collision resolution procedure in the first slot and performing a second collision resolution procedure in the second slot, the second collision resolution procedure being independent of the first collision resolution procedure.

14. The method of any preceding clause, wherein performing the first collision resolution procedure in the first slot and performing the second collision resolution procedure in the second slot further comprises:

determining whether one or more low priority scheduled uplink transmissions of the plurality scheduled uplink transmissions overlap with the one or more high priority scheduled uplink transmissions of the two or more additional scheduled uplink transmissions in each slot, wherein the one or more high priority scheduled uplink transmissions are scheduled by a physical downlink control channel (PDCCH); and cancelling the one or more low priority scheduled uplink transmissions based on a determination that the one or more low priority scheduled uplink transmissions of the two or more additional scheduled uplink transmissions overlap with the one or more high priority scheduled uplink transmissions of the two or more additional scheduled uplink transmissions.

15. The method of any preceding clause, wherein cancelling the one or more low priority uplink transmissions further comprises cancelling the one or more low priority uplink transmissions at least one or both of prior to and subsequent to resolving a collision between multiple overlapping high priority uplink transmissions of the plurality of uplink transmissions.

16. The method of any preceding clause, wherein performing the first collision resolution procedure in the first slot further comprises:

determining whether at least two high priority uplink transmissions of the plurality of uplink transmissions overlap in more than one of the first slot and the second slot;

determining whether any of one or more low priority uplink transmissions of the plurality of uplink transmissions overlaps with any of the at least two high priority uplink transmissions of the plurality of uplink transmissions in the first slot, wherein any of the at least two high priority uplink transmissions are scheduled by a physical downlink control channel (PDCCH); and cancelling any of the one or more low priority uplink transmissions from the first slot based on a determination that any of the one or more low priority uplink transmissions of the plurality of uplink transmissions overlaps with any of the at least two high priority uplink transmissions of the plurality of uplink transmissions.

17. The method of any preceding clause, further comprising:

determining whether each of the at least two high priority uplink transmissions are scheduled by the PDCCH, and wherein cancelling the one or more low priority uplink transmissions from the first slot further comprises cancelling the one or more low priority uplink transmissions from the first slot upon reception of a downlink control information (DCI) for one of the at least two high priority uplink transmissions based on a determination that each of the at least two high priority uplink transmissions are scheduled by the PDCCH.

18. The method of any preceding clause, wherein performing the second collision resolution procedure in the second slot further comprises:

cancelling any of the at least two high priority uplink transmissions of the plurality of uplink transmissions with lower priority types using a priority hierarchy for the second slot that includes remaining overlapping high priority uplink transmissions of the at least two high priority uplink transmissions of the plurality of uplink transmissions, wherein any remaining high priority uplink transmission of the at least two high priority uplink transmissions do not overlap with one another;

determining whether any of the one or more low priority uplink transmissions of the plurality of uplink transmissions overlap any remaining high priority uplink transmission for the second slot; and cancelling any of the one or more low priority uplink transmissions of the plurality of uplink transmission for the second slot based on a determination that any of the one or more low priority uplink transmissions of the plurality of uplink transmissions overlap any remaining high priority uplink transmission for the second slot.

19. The method of any preceding clause, wherein performing the first collision resolution procedure in the first slot and performing the second collision resolution procedure in the second slot further comprises:

determining whether at least two high priority uplink transmissions of the plurality of uplink transmissions overlap in one or more slots of the at least one slot;

determining whether at least one of the at least two high priority uplink transmissions is scheduled for repetitive uplink transmissions by a downlink control information (DCI) in a physical downlink control channel (PDCCH) based on a determination that the at least two high priority scheduled uplink transmissions of the two or more additional scheduled uplink transmissions overlap in the one or more slots of the at least one slot; and cancelling one or more of any of the one or more low priority uplink transmissions and any of the at least two high priority uplink transmissions from the first slot that includes the repetitive uplink transmissions based on a determination that the at least one of the at least two high priority uplink transmissions is scheduled for repetitive uplink transmissions by the DCI in the PDCCH.

20. The method of any preceding clause, further comprising resolving one or more collisions between any of the one or more low priority uplink transmissions and any of the at least two high priority uplink transmissions for the second slot, wherein the at least two high priority uplink transmissions in the second slot corresponding to a repetitive transmission are configured as a high priority uplink transmission that is not scheduled by the DCI in the PDCCH.

21. The method of any preceding clause, further comprising forgoing cancellation of any of the one or more low priority uplink transmissions that overlap with the first high priority uplink transmission of the at least two high priority uplink transmissions until confirmation that the first high priority uplink transmission of the at least two high priority uplink transmissions is transmitted in the second slot.

22. An apparatus for wireless communication at a user equipment (UE), comprising:

a transceiver;

a memory; and one or more processors coupled with the transceiver and the memory, wherein the one or more processors and the memory are configured to:

identify a plurality of uplink transmissions that overlap in at least a first slot and a second slot, wherein the plurality of uplink transmissions comprises a high priority uplink transmission scheduled for repetitive transmission across at least the first slot and the second slot and further comprises one or more uplink transmissions scheduled in the first slot and two or more uplink transmissions scheduled in the second slot, wherein the two or more uplink transmissions scheduled in the second slot comprise at least a first low priority uplink transmission and a second high priority uplink transmission; and perform a first collision resolution procedure in the first slot and performing a second collision resolution procedure in the second slot, the second collision resolution procedure being independent of the first collision resolution procedure.

23. The apparatus of any preceding clause, wherein the one or more processors configured to perform the first collision resolution procedure in the first slot and perform the second collision resolution procedure in the second slot are further configured to:

determine whether one or more low priority scheduled uplink transmissions of the plurality scheduled uplink transmissions overlap with the one or more high priority scheduled uplink transmissions of the two or more scheduled uplink transmissions in each slot, wherein the one or more high priority scheduled uplink transmissions are scheduled by a physical downlink control channel (PDCCH); and cancel the one or more low priority scheduled uplink transmissions based on a determination that the one or more low priority scheduled uplink transmissions of the two or more scheduled uplink transmissions overlap with the one or more high priority scheduled uplink transmissions of the two or more scheduled uplink transmissions.

24. The apparatus of any preceding clause, wherein the one or more processors configured to cancel the one or more low priority uplink transmissions are further configured to cancel the one or more low priority uplink transmissions at least one or both prior and subsequent to resolving a collision between multiple overlapping high priority uplink transmissions of the plurality of uplink transmissions.

25. The apparatus of any preceding clause, wherein the one or more processors configured to perform the first collision resolution procedure in the first slot are further configured to:

determine whether at least two high priority uplink transmissions of the plurality of uplink transmissions overlap in more than one of the first slot and the second slot;

determine whether any of one or more low priority uplink transmissions of the plurality of uplink transmissions overlaps with any of the at least two high priority uplink transmissions of the plurality of uplink transmissions in the first slot, wherein any of the at least two high priority uplink transmissions are scheduled by a physical downlink control channel (PDCCH); and cancel any of the one or more low priority uplink transmissions from the first slot based on a determination that any of the one or more low priority uplink transmissions of the plurality of uplink transmissions overlaps with any of the at least two high priority uplink transmissions of the plurality of uplink transmissions.

26. The apparatus of any preceding clause, wherein the one or more processors are configured to:

determine whether each of the at least two high priority uplink transmissions are scheduled by the PDCCH, and wherein the one or more processors configured to cancel the one or more low priority uplink transmissions from the first slot are further configured to cancel the one or more low priority uplink transmissions from the first slot upon reception of a downlink control information (DCI) for one of the at least two high priority uplink transmissions based on a determination that each of the at least two high priority uplink transmissions are scheduled by the PDCCH.

27. The apparatus of any preceding clause, wherein the one or more processors configured to perform the second collision resolution procedure in the second slot are further configured to:

cancel any of the at least two high priority uplink transmissions of the plurality of uplink transmissions with lower priority types using a priority hierarchy for the second slot that includes remaining overlapping high priority uplink transmissions of the at least two high priority uplink transmissions of the plurality of uplink transmissions, wherein any remaining high priority uplink transmission of the at least two high priority uplink transmissions do not overlap with one another;

determine whether any of the one or more low priority uplink transmissions of the plurality of uplink transmissions overlap any remaining high priority uplink transmission for the second slot; and cancel any of the one or more low priority uplink transmissions of the plurality of uplink transmission for the second slot based on a determination that any of the one or more low priority uplink transmissions of the plurality of uplink transmissions overlap any remaining high priority uplink transmission for the second slot.

28. The apparatus of any preceding clause, wherein the one or more processors configured to perform the first collision resolution procedure in the first slot and perform the second collision resolution procedure in the second slot are further configured to:

determine whether at least two high priority uplink transmissions of the plurality of uplink transmissions overlap in one or more slots of the at least one slot;

determine whether at least one of the at least two high priority uplink transmissions is scheduled for repetitive uplink transmissions by a downlink control information (DCI) in a physical downlink control channel (PDCCH) based on a determination that the at least two high priority scheduled uplink transmissions of the two or more scheduled uplink transmissions overlap in the one or more slots of the at least one slot; and cancel one or more of any of the one or more low priority uplink transmissions and any of the at least two high priority uplink transmissions from the first slot that includes the repetitive uplink transmissions based on a determination that the at least one of the at least two high priority uplink transmissions is scheduled for repetitive uplink transmissions by the DCI in the PDCCH.

29. The apparatus of any preceding clause, wherein the one or more processors are configured to resolve one or more collisions between any of the one or more low priority uplink transmissions and any of the at least two high priority uplink transmissions for the second slot, wherein the one or more high priority uplink transmissions in the second slot corresponding to a repetitive transmission are configured as a high priority uplink transmission that is not scheduled by the DCI in the PDCCH.

30. The apparatus of any preceding clause, wherein the one or more processors are configured to forgo cancellation of any of the one or more low priority uplink transmissions that overlap with the high priority uplink transmission of the one or more high priority uplink transmissions until confirmation that the high priority uplink transmission of the one or more high priority uplink transmissions is transmitted in the second slot.

31. An apparatus for wireless communication at a user equipment (UE), comprising:

means for identifying a plurality of uplink transmissions that overlap in at least a first slot and a second slot, wherein the plurality of uplink transmissions comprises a high priority uplink transmission scheduled for repetitive transmission across at least a first slot and a second slot and further comprises one or more uplink transmissions scheduled in the first slot and two or more uplink transmissions scheduled in the second slot, wherein the two or more uplink transmissions scheduled in the second slot comprise at least a first low priority uplink transmission and a second high priority uplink transmission; and means for performing a first collision resolution procedure in the first slot and performing a second collision resolution procedure in the second slot, the second collision resolution procedure being independent of the first collision resolution procedure.

32. The apparatus of any preceding clause, wherein means for performing the first collision resolution procedure in the first slot and means for performing the second collision resolution procedure in the second slot further comprises:

means for determining whether one or more low priority scheduled uplink transmissions of the plurality scheduled uplink transmissions overlap with the one or more high priority scheduled uplink transmissions of the two or more scheduled uplink transmissions in each slot, wherein the one or more high priority scheduled uplink transmissions are scheduled by a physical downlink control channel (PDCCH); and cancelling the one or more low priority scheduled uplink transmissions based on a determination that the one or more low priority scheduled uplink transmissions of the two or more scheduled uplink transmissions overlap with the one or more high priority scheduled uplink transmissions of the two or more scheduled uplink transmissions.

33. The apparatus of any preceding clause, wherein means for cancelling the one or more low priority uplink transmissions further comprises means for cancelling the one or more low priority uplink transmissions at least one or both of prior to and subsequent to resolving a collision between multiple overlapping high priority uplink transmissions of the plurality of uplink transmissions.

34. The apparatus of any preceding clause, wherein means for performing the first collision resolution procedure in the first slot further comprises:

means for determining whether at least two high priority uplink transmissions of the plurality of uplink transmissions overlap in more than one of the first slot and the second slot;

means for determining whether any of one or more low priority uplink transmissions of the plurality of uplink transmissions overlaps with any of the at least two high priority uplink transmissions of the plurality of uplink transmissions in the first slot, wherein any of the at least two high priority uplink transmissions are scheduled by a physical downlink control channel (PDCCH); and means for cancelling any of the one or more low priority uplink transmissions from the first slot based on a determination that any of the one or more low priority uplink transmissions of the plurality of uplink transmissions overlaps with any of the at least two high priority uplink transmissions of the plurality of uplink transmissions.

35. The apparatus of any preceding clause, further comprising:

means for determining whether each of the at least two high priority uplink transmissions are scheduled by the PDCCH, and wherein means for cancelling the one or more low priority uplink transmissions from the first slot further comprises means for cancelling the one or more low priority uplink transmissions from the first slot upon reception of a downlink control information (DCI) for one of the at least two high priority uplink transmissions based on a determination that each of the at least two high priority uplink transmissions are scheduled by the PDCCH.

36. The apparatus of any preceding clause, wherein means for performing the second collision resolution procedure in the second slot further comprises:

means for cancelling any of the at least two high priority uplink transmissions of the plurality of uplink transmissions with lower priority types using a priority hierarchy for the second slot that includes remaining overlapping high priority uplink transmissions of the at least two high priority uplink transmissions of the plurality of uplink transmissions, wherein any remaining high priority uplink transmission of the at least two high priority uplink transmissions do not overlap with one another;

means for determining whether any of the one or more low priority uplink transmissions of the plurality of uplink transmissions overlap any remaining high priority uplink transmission for the second slot; and means for cancelling any of the one or more low priority uplink transmissions of the plurality of uplink transmission for the second slot based on a determination that any of the one or more low priority uplink transmissions of the plurality of uplink transmissions overlap any remaining high priority uplink transmission for the second slot.

37. The apparatus of any preceding clause, wherein means for performing the first collision resolution procedure in the first slot and means for performing the second collision resolution procedure in the second slot further comprises:

means for determining whether at least two high priority uplink transmissions of the plurality of uplink transmissions overlap in one or more slots of the at least one slot;

means for determining whether at least one of the at least two high priority uplink transmissions is scheduled for repetitive uplink transmissions by a downlink control information (DCI) in a physical downlink control channel (PDCCH) based on a determination that the at least two high priority scheduled uplink transmissions of the two or more scheduled uplink transmissions overlap in the one or more slots of the at least one slot;

means for cancelling one or more of any of the one or more low priority uplink transmissions and any of the at least two high priority uplink transmissions from the first slot that includes the repetitive uplink transmissions based on a determination that the at least one of the at least two high priority uplink transmissions is scheduled for repetitive uplink transmissions by the DCI in the PDCCH;

means for resolving one or more collisions between any of the one or more low priority uplink transmissions and any of the at least two high priority uplink transmissions for the second slot, wherein the one or more high priority uplink transmissions in the second slot corresponding to a repetitive transmission are configured as a high priority uplink transmission that is not scheduled by the DCI in the PDCCH; and means for forgoing cancellation of any of the one or more low priority uplink transmissions that overlap with the high priority uplink transmission of the one or more high priority uplink transmissions until confirmation that the high priority uplink transmission of the one or more high priority uplink transmissions is transmitted in the second slot.

38. A non-transitory computer-readable medium at a user equipment (UE), comprising code executable by one or more processors to:

identify a plurality of uplink transmissions that overlap in at least a first slot and a second slot, wherein the plurality of uplink transmissions comprises a high priority uplink transmission scheduled for repetitive transmission across at least a first slot and a second slot and further comprises one or more uplink transmissions scheduled in the first slot and two or more uplink transmissions scheduled in the second slot, wherein the two or more uplink transmissions scheduled in the second slot comprise at least a first low priority uplink transmission and a second high priority uplink transmission; and perform a first collision resolution procedure in the first slot and performing a second collision resolution procedure in the second slot, the second collision resolution procedure being independent of the first collision resolution procedure.

39. The non-transitory computer-readable medium of any preceding clause, wherein the one or more processors configured to perform the first collision resolution procedure in the first slot and perform the second collision resolution procedure in the second slot are further configured to:

determine whether one or more low priority scheduled uplink transmissions of the plurality scheduled uplink transmissions overlap with the one or more high priority scheduled uplink transmissions of the two or more scheduled uplink transmissions in each slot, wherein the one or more high priority scheduled uplink transmissions are scheduled by a physical downlink control channel (PDCCH); and cancel the one or more low priority scheduled uplink transmissions based on a determination that the one or more low priority scheduled uplink transmissions of the two or more scheduled uplink transmissions overlap with the one or more high priority scheduled uplink transmissions of the two or more scheduled uplink transmissions.

40. The non-transitory computer-readable medium of any preceding clause, wherein the one or more processors configured to cancel the one or more low priority uplink transmissions are further configured to cancel the one or more low priority uplink transmissions at least one or both prior and subsequent to resolving a collision between multiple overlapping high priority uplink transmissions of the plurality of uplink transmissions.

41. The non-transitory computer-readable medium of any preceding clause, wherein the one or more processors configured to perform the first collision resolution procedure in the first slot are further configured to:

determine whether at least two high priority uplink transmissions of the plurality of uplink transmissions overlap in more than one of the first slot and the second slot;

determine whether any of one or more low priority uplink transmissions of the plurality of uplink transmissions overlaps with any of the at least two high priority uplink transmissions of the plurality of uplink transmissions in the first slot, wherein any of the at least two high priority uplink transmissions are scheduled by a physical downlink control channel (PDCCH); and cancel any of the one or more low priority uplink transmissions from the first slot based on a determination that any of the one or more low priority uplink transmissions of the plurality of uplink transmissions overlaps with any of the at least two high priority uplink transmissions of the plurality of uplink transmissions.

42. The non-transitory computer-readable medium of any preceding clause, wherein the one or more processors are configured to:

determine whether each of the at least two high priority uplink transmissions are scheduled by the PDCCH, and wherein the one or more processors configured to cancel the one or more low priority uplink transmissions from the first slot are further configured to cancel the one or more low priority uplink transmissions from the first slot upon reception of a downlink control information (DCI) for one of the at least two high priority uplink transmissions based on a determination that each of the at least two high priority uplink transmissions are scheduled by the PDCCH.

43. The non-transitory computer-readable medium of any preceding clause, wherein the one or more processors configured to perform the second collision resolution procedure in the second slot are further configured to:

cancel any of the at least two high priority uplink transmissions of the plurality of uplink transmissions with lower priority types using a priority hierarchy for the second slot that includes remaining overlapping high priority uplink transmissions of the at least two high priority uplink transmissions of the plurality of uplink transmissions, wherein any remaining high priority uplink transmission of the at least two high priority uplink transmissions do not overlap with one another;

determine whether any of the one or more low priority uplink transmissions of the plurality of uplink transmissions overlap any remaining high priority uplink transmission for the second slot; and cancel any of the one or more low priority uplink transmissions of the plurality of uplink transmission for the second slot based on a determination that any of the one or more low priority uplink transmissions of the plurality of uplink transmissions overlap any remaining high priority uplink transmission for the second slot.

44. The non-transitory computer-readable medium of any preceding clause, wherein the one or more processors configured to perform the first collision resolution procedure in the first slot and perform the second collision resolution procedure in the second slot are further configured to:

determine whether at least two high priority uplink transmissions of the plurality of uplink transmissions overlap in one or more slots of the at least one slot;

determine whether at least one of the at least two high priority uplink transmissions is scheduled for repetitive uplink transmissions by a downlink control information (DCI) in a physical downlink control channel (PDCCH) based on a determination that the at least two high priority scheduled uplink transmissions of the two or more scheduled uplink transmissions overlap in the one or more slots of the at least one slot;

cancel one or more of any of the one or more low priority uplink transmissions and any of the at least two high priority uplink transmissions from the first slot that includes the repetitive uplink transmissions based on a determination that the at least one of the at least two high priority uplink transmissions is scheduled for repetitive uplink transmissions by the DCI in the PDCCH; and resolve one or more collisions between any of the one or more low priority uplink transmissions and any of the at least two high priority uplink transmissions for the second slot, wherein the one or more high priority uplink transmissions in the second slot corresponding to a repetitive transmission are configured as a high priority uplink transmission that is not scheduled by the DCI in the PDCCH.

45. The non-transitory computer-readable medium of any preceding clause, wherein the one or more processors are configured to forgo cancellation of any of the one or more low priority uplink transmissions that overlap with the high priority uplink transmission of the one or more high priority uplink transmissions until confirmation that the high priority uplink transmission of the one or more high priority uplink transmissions is transmitted in the second slot.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
    identifying a plurality of uplink transmissions that overlap in at least a first slot and a second slot, wherein the plurality of uplink transmissions comprises
        a first high priority uplink transmission scheduled for repetitive transmission across at least the first slot and the second slot,
        one or more additional uplink transmissions scheduled in the first slot, and
        two or more additional uplink transmissions scheduled in the second slot, the two or more additional uplink transmissions scheduled in the second slot comprising at least a low priority uplink transmission and a second high priority uplink transmission; and
    performing a first collision resolution procedure in the first slot and performing a second collision resolution procedure in the second slot, the second collision resolution procedure being independent of the first collision resolution procedure.

2. The method of claim 1, wherein performing the first collision resolution procedure in the first slot and performing the second collision resolution procedure in the second slot further comprises:
    determining whether one or more low priority scheduled uplink transmissions of the plurality scheduled uplink transmissions overlap with one or more high priority scheduled uplink transmissions of the two or more additional scheduled uplink transmissions in each slot, wherein the one or more high priority scheduled uplink transmissions are scheduled by a physical downlink control channel (PDCCH); and
    cancelling the one or more low priority scheduled uplink transmissions based on a determination that the one or more low priority scheduled uplink transmissions overlap with the one or more high priority scheduled uplink transmissions of the two or more additional scheduled uplink transmissions.

3. The method of claim 2, wherein cancelling the one or more low priority uplink transmissions further comprises cancelling the one or more low priority uplink transmissions at least one or both of prior to and subsequent to resolving a collision between multiple overlapping high priority uplink transmissions of the plurality of uplink transmissions.

4. The method of claim 1, wherein performing the first collision resolution procedure in the first slot further comprises:
    determining whether at least two high priority uplink transmissions of the plurality of uplink transmissions overlap in more than one of the first slot and the second slot;
    determining whether any of one or more low priority uplink transmissions of the plurality of uplink transmissions overlaps with any of the at least two high priority uplink transmissions of the plurality of uplink transmissions in the first slot, wherein any of the at least two high priority uplink transmissions are scheduled by a physical downlink control channel (PDCCH); and
    cancelling any of the one or more low priority uplink transmissions from the first slot based on a determination that any of the one or more low priority uplink transmissions of the plurality of uplink transmissions overlaps with any of the at least two high priority uplink transmissions of the plurality of uplink transmissions.

5. The method of claim 4, further comprising:
    determining whether each of the at least two high priority uplink transmissions are scheduled by the PDCCH; and
    wherein cancelling any of the one or more low priority uplink transmissions from the first slot further comprises cancelling any of the one or more low priority uplink transmissions from the first slot upon reception of a downlink control information (DCI) for one of the at least two high priority uplink transmissions based on a determination that each of the at least two high priority uplink transmissions are scheduled by the PDCCH.

6. The method of claim 4, wherein performing the second collision resolution procedure in the second slot further comprises:
    cancelling any of the at least two high priority uplink transmissions of the plurality of uplink transmissions with lower priority types using a priority hierarchy for the second slot that includes remaining overlapping high priority uplink transmissions of the at least two high priority uplink transmissions of the plurality of uplink transmissions, wherein any remaining high priority uplink transmission of the at least two high priority uplink transmissions do not overlap with one another;
    determining whether any of the one or more low priority uplink transmissions of the plurality of uplink transmissions overlap any remaining high priority uplink transmission for the second slot; and
    cancelling any of the one or more low priority uplink transmissions of the plurality of uplink transmission for the second slot based on a determination that any of the one or more low priority uplink transmissions of the plurality of uplink transmissions overlap any remaining high priority uplink transmission for the second slot.

7. The method of claim 1, wherein performing the first collision resolution procedure in the first slot and performing the second collision resolution procedure in the second slot further comprises:
    determining whether at least two high priority uplink transmissions of the plurality of uplink transmissions overlap in one or more slots of the at least the first slot and the second slot;
    determining whether at least one of the at least two high priority uplink transmissions is scheduled for repetitive uplink transmissions by a downlink control information (DCI) in a physical downlink control channel (PDCCH) based on a determination that the at least two high priority scheduled uplink transmissions overlap in the one or more slots of the at least the first slot and the second slot; and cancelling one or more of any of one or more low priority uplink transmissions and any of the at least two high priority uplink transmissions from the first slot that includes the repetitive uplink transmissions based on a determination that the at least one of the at least two high priority uplink transmissions is scheduled for repetitive uplink transmissions by the DCI in the PDCCH.

8. The method of claim 7, further comprising resolving one or more collisions between any of the one or more low priority uplink transmissions and any of the at least two high priority uplink transmissions for the second slot, wherein the at least two high priority uplink transmissions in the second slot corresponding to a repetitive transmission are configured as a high priority uplink transmission that is not scheduled by the DCI in the PDCCH.

9. The method of claim 8, further comprising forgoing cancellation of any of the one or more low priority uplink transmissions that overlap with the first high priority uplink transmission of the at least two high priority uplink transmissions until confirmation that the first high priority uplink transmission of the at least two high priority uplink transmissions is transmitted in the second slot.

10. An apparatus for wireless communication at a user equipment (UE), comprising:

a transceiver;

a memory; and one or more processors coupled with the transceiver and the memory, wherein the one or more processors and the memory are configured to:

identify a plurality of uplink transmissions that overlap in at least a first slot and a second slot, wherein the plurality of uplink transmissions comprises a first high priority uplink transmission scheduled for repetitive transmission across at least the first slot and the second slot, one or more additional uplink transmissions scheduled in the first slot, and two or more additional uplink transmissions scheduled in the second slot, the two or more additional uplink transmissions scheduled in the second slot comprising at least a first low priority uplink transmission and a second high priority uplink transmission; and perform a first collision resolution procedure in the first slot and performing a second collision resolution procedure in the second slot, the second collision resolution procedure being independent of the first collision resolution procedure.

11. The apparatus of claim 10, wherein the one or more processors configured to perform the first collision resolution procedure in the first slot and to perform the second collision resolution procedure in the second slot are further configured to:

determine whether one or more low priority scheduled uplink transmissions of the plurality scheduled uplink transmissions overlap with one or more high priority scheduled uplink transmissions of the two or more additional scheduled uplink transmissions in each slot, wherein the one or more high priority scheduled uplink transmissions are scheduled by a physical downlink control channel (PDCCH); and cancel the one or more low priority scheduled uplink transmissions based on a determination that the one or more low priority scheduled uplink transmissions overlap with the one or more high priority scheduled uplink transmissions of the two or more additional scheduled uplink transmissions.

12. The apparatus of claim 11, wherein the one or more processors configured to cancel the one or more low priority uplink transmissions are further configured to cancel the one or more low priority uplink transmissions at least one or both prior to and subsequent to resolving a collision between multiple overlapping high priority uplink transmissions of the plurality of uplink transmissions.

13. The apparatus of claim 12, wherein the one or more processors configured to perform the first collision resolution procedure in the first slot are further configured to:

determine whether at least two high priority uplink transmissions of the plurality of uplink transmissions overlap in more than one of the first slot and the second slot;

determine whether any of one or more low priority uplink transmissions of the plurality of uplink transmissions overlaps with any of the at least two high priority uplink transmissions of the plurality of uplink transmissions in the first slot, wherein any of the at least two high priority uplink transmissions are scheduled by a physical downlink control channel (PDCCH); and cancel any of the one or more low priority uplink transmissions from the first slot based on a determination that any of the one or more low priority uplink transmissions of the plurality of uplink transmissions overlap with any of the at least two high priority uplink transmissions of the plurality of uplink transmissions.

14. The apparatus of claim 13, wherein the one or more processors further are configured to:

determine whether each of the at least two high priority uplink transmissions are scheduled by the PDCCH; and wherein the one or more processors configured to cancel any of the one or more low priority uplink transmissions from the first slot are further configured to cancel any of the one or more low priority uplink transmissions from the first slot upon reception of a downlink control information (DCI) for one of the at least two high priority uplink transmissions based on a determination that each of the at least two high priority uplink transmissions are scheduled by the PDCCH.

15. The apparatus of claim 13, wherein the one or more processors configured to perform the second collision resolution procedure in the second slot are further configured to:

cancel any of the at least two high priority uplink transmissions of the plurality of uplink transmissions with lower priority types using a priority hierarchy for the second slot that includes remaining overlapping high priority uplink transmissions of the at least two high priority uplink transmissions of the plurality of uplink transmissions, wherein any remaining high priority uplink transmission of the at least two high priority uplink transmissions do not overlap with one another;

determine whether any of the one or more low priority uplink transmissions of the plurality of uplink transmissions overlap any remaining high priority uplink transmission for the second slot; and cancel any of the one or more low priority uplink transmissions of the plurality of uplink transmissions for the second slot based on a determination that any of the one or more low priority uplink transmissions of the plurality of uplink transmissions overlap any remaining high priority uplink transmission for the second slot.

16. The apparatus of claim 10, wherein the one or more processors configured to perform the first collision resolution procedure in the first slot and perform the second collision resolution procedure in the second slot are further configured to:

determine whether at least two high priority uplink transmissions of the plurality of uplink transmissions overlap in one or more slots of the at least the first slot and the second slot;

determine whether at least one of the at least two high priority uplink transmissions is scheduled for repetitive uplink transmissions by a downlink control information (DCI) in a physical downlink control channel (PDCCH) based on a determination that the at least two high priority scheduled uplink transmissions of the two or more additional scheduled uplink transmissions overlap in the one or more slots of the at least the first slot and the second slot; and cancel one or more of any of the one or more low priority uplink transmissions and any of the at least two high priority uplink transmissions from the first slot that includes the repetitive uplink transmissions based on a determination that the at least one of the at least two high priority uplink transmissions is scheduled for repetitive uplink transmissions by the DCI in the PDCCH.

17. The apparatus of claim 16, wherein the one or more processors are configured to resolve one or more collisions between any of the one or more low priority uplink transmissions and any of the at least two high priority uplink transmissions for the second slot, wherein the at least two high priority uplink transmissions in the second slot corresponding to a repetitive transmission are configured as a high priority uplink transmission that is not scheduled by the DCI in the PDCCH.

18. The apparatus of claim 17, wherein the one or more processors are configured to forgo cancellation of any of the one or more low priority uplink transmissions that overlap with the high priority uplink transmission of the at least two high priority uplink transmissions until confirmation that the high priority uplink transmission of the at least two high priority uplink transmissions is transmitted in the second slot.

19. An apparatus for wireless communication at a user equipment (UE), comprising:

means for identifying a plurality of uplink transmissions that overlap in at least a first slot and a second slot, wherein the plurality of uplink transmissions comprises a high priority uplink transmission scheduled for repetitive transmission across at least a first slot and a second slot, one or more additional uplink transmissions scheduled in the first slot, and two or more additional uplink transmissions scheduled in the second slot, the two or more additional uplink transmissions scheduled in the second slot comprising at least a first low priority uplink transmission and a second high priority uplink transmission; and means for performing a first collision resolution procedure in the first slot and performing a second collision resolution procedure in the second slot, the second collision resolution procedure being independent of the first collision resolution procedure.

20. The apparatus of claim 19, wherein means for performing the first collision resolution procedure in the first slot and means for performing the second collision resolution procedure in the second slot further comprises:

means for determining whether one or more low priority scheduled uplink transmissions of the plurality scheduled uplink transmissions overlap with one or more high priority scheduled uplink transmissions of the two or more scheduled uplink transmissions in each slot, wherein the one or more high priority scheduled uplink transmissions are scheduled by a physical downlink control channel (PDCCH); and means for cancelling the one or more low priority scheduled uplink transmissions based on a determination that the one or more low priority scheduled uplink transmissions overlap with the one or more high priority scheduled uplink transmissions of the two or more additional scheduled uplink transmissions.

21. The apparatus of claim 20, wherein means for cancelling the one or more low priority uplink transmissions further comprises means for cancelling the one or more low priority uplink transmissions at least one or both of prior to and subsequent to resolving a collision between multiple overlapping high priority uplink transmissions of the plurality of uplink transmissions.

22. The apparatus of claim 19, wherein means for performing the first collision resolution procedure in the first slot further comprises:

means for determining whether at least two high priority uplink transmissions of the plurality of uplink transmissions overlap in more than one of the first slot and the second slot;

means for determining whether any of one or more low priority uplink transmissions of the plurality of uplink transmissions overlaps with any of the at least two high priority uplink transmissions of the plurality of uplink transmissions in the first slot, wherein any of the at least two high priority uplink transmissions are scheduled by a physical downlink control channel (PDCCH); and means for cancelling any of the one or more low priority uplink transmissions from the first slot based on a determination that any of the one or more low priority uplink transmissions of the plurality of uplink transmissions overlaps with any of the at least two high priority uplink transmissions of the plurality of uplink transmissions.

23. The apparatus of claim 22, further comprising:

means for determining whether each of the at least two high priority uplink transmissions are scheduled by the PDCCH; and wherein means for cancelling the one or more low priority uplink transmissions from the first slot further comprises means for cancelling the one or more low priority uplink transmissions from the first slot upon reception of a downlink control information (DCI) for one of the at least two high priority uplink transmissions based on a determination that each of the at least two high priority uplink transmissions are scheduled by the PDCCH.

24. The apparatus of claim 22, wherein means for performing the second collision resolution procedure in the second slot further comprises:

means for cancelling any of the at least two high priority uplink transmissions of the plurality of uplink transmissions with lower priority types using a priority hierarchy for the second slot that includes remaining overlapping high priority uplink transmissions of the at least two high priority uplink transmissions of the plurality of uplink transmissions, wherein any remaining high priority uplink transmission of the at least two high priority uplink transmissions do not overlap with one another;

means for determining whether any of the one or more low priority uplink transmissions of the plurality of uplink transmissions overlap any remaining high priority uplink transmission for the second slot; and means for cancelling any of the one or more low priority uplink transmissions of the plurality of uplink transmission for the second slot based on a determination that any of the one or more low priority uplink transmissions of the plurality of uplink transmissions overlap any remaining high priority uplink transmission for the second slot.

25. The apparatus of claim 19, wherein means for performing the first collision resolution procedure in the first slot and means for performing the second collision resolution procedure in the second slot further comprises:

means for determining whether at least two high priority uplink transmissions of the plurality of uplink transmissions overlap in one or more slots of the at least the first slot and the second slot;

means for determining whether at least one of the at least two high priority uplink transmissions is scheduled for repetitive uplink transmissions by a downlink control information (DCI) in a physical downlink control channel (PDCCH) based on a determination that the at least two high priority scheduled uplink transmissions of the two or more additional scheduled uplink transmissions overlap in the one or more slots of the at least the first slot and the second slot;

means for cancelling one or more of any of the one or more low priority uplink transmissions and any of the at least two high priority uplink transmissions from the first slot that includes the repetitive uplink transmissions based on a determination that the at least one of the at least two high priority uplink transmissions is scheduled for repetitive uplink transmissions by the DCI in the PDCCH;

means for resolving one or more collisions between any of the one or more low priority uplink transmissions and any of the at least two high priority uplink transmissions for the second slot, wherein the at least two high priority uplink transmissions in the second slot corresponding to a repetitive transmission are configured as a high priority uplink transmission that is not scheduled by the DCI in the PDCCH; and means for forgoing cancellation of any of the one or more low priority uplink transmissions that overlap with the high priority uplink transmission of the at least two priority uplink transmissions until confirmation that the high priority uplink transmission of the at least two priority uplink transmissions is transmitted in the second slot.

26. A non-transitory computer-readable medium at a user equipment (UE), comprising code executable by one or more processors to:

identify a plurality of uplink transmissions that overlap in at least a first slot and a second slot, wherein the plurality of uplink transmissions comprises
a high priority uplink transmission scheduled for repetitive transmission across at least a first slot and a second slot,
one or more additional uplink transmissions scheduled in the first slot, and
two or more additional uplink transmissions scheduled in the second slot, the two or more additional uplink transmissions scheduled in the second slot comprising at least a first low priority uplink transmission and a second high priority uplink transmission; and perform a first collision resolution procedure in the first slot and performing a second collision resolution procedure in the second slot, the second collision resolution procedure being independent of the first collision resolution procedure.

27. The non-transitory computer-readable medium of claim 26, wherein the one or more processors configured to perform the first collision resolution procedure in the first slot and perform the second collision resolution procedure in the second slot are further configured to:

determine whether one or more low priority scheduled uplink transmissions of the plurality scheduled uplink transmissions overlap with one or more high priority scheduled uplink transmissions of the two or more additional scheduled uplink transmissions in each slot, wherein the one or more high priority scheduled uplink transmissions are scheduled by a physical downlink control channel (PDCCH); and cancel the one or more low priority scheduled uplink transmissions based on a determination that the one or more low priority scheduled uplink transmissions overlap with the one or more high priority scheduled uplink transmissions of the two or more additional scheduled uplink transmissions.

28. The non-transitory computer-readable medium of claim 27, wherein the one or more processors configured to cancel the one or more low priority uplink transmissions are further configured to cancel the one or more low priority uplink transmissions at least one or both prior to and subsequent to resolving a collision between multiple overlapping high priority uplink transmissions of the plurality of uplink transmissions.

29. The non-transitory computer-readable medium of claim 28, wherein the one or more processors configured to perform the first collision resolution procedure in the first slot are further configured to:

determine whether at least two high priority uplink transmissions of the plurality of uplink transmissions overlap in more than one of the first slot and the second slot;

determine whether any of one or more low priority uplink transmissions of the plurality of uplink transmissions overlaps with any of the at least two high priority uplink transmissions of the plurality of uplink transmissions in the first slot, wherein any of the at least two high priority uplink transmissions are scheduled by a physical downlink control channel (PDCCH); and cancel any of the one or more low priority uplink transmissions from the first slot based on a determination that any of the one or more low priority uplink transmissions of the plurality of uplink transmissions overlaps with any of the at least two high priority uplink transmissions of the plurality of uplink transmissions.

30. The non-transitory computer-readable medium of claim 29, wherein the one or more processors are configured to:

determine whether each of the at least two high priority uplink transmissions are scheduled by the PDCCH; and wherein the one or more processors configured to cancel the one or more low priority uplink transmissions from the first slot are further configured to cancel the one or more low priority uplink transmissions from the first slot upon reception of a downlink control information (DCI) for one of the at least two high priority uplink transmissions based on a determination that each of the at least two high priority uplink transmissions are scheduled by the PDCCH.

31. The non-transitory computer-readable medium of claim 29, wherein the one or more processors configured to perform the second collision resolution procedure in the second slot are further configured to:

cancel any of the at least two high priority uplink transmissions of the plurality of uplink transmissions with lower priority types using a priority hierarchy for the second slot that includes remaining overlapping high priority uplink transmissions of the at least two high priority uplink transmissions of the plurality of uplink transmissions, wherein any remaining high priority uplink transmission of the at least two high priority uplink transmissions do not overlap with one another;

determine whether any of the one or more low priority uplink transmissions of the plurality of uplink transmissions overlap any remaining high priority uplink transmission for the second slot; and cancel any of the one or more low priority uplink transmissions of the plurality of uplink transmission for the second slot based on a determination that any of the one or more low priority uplink transmissions of the plurality of uplink transmissions overlap any remaining high priority uplink transmission for the second slot.

32. The non-transitory computer-readable medium of claim 26, wherein the one or more processors configured to perform the first collision resolution procedure in the first slot and perform the second collision resolution procedure in the second slot are further configured to:

determine whether at least two high priority uplink transmissions of the plurality of uplink transmissions overlap in one or more slots of the at least the first slot and the second slot;

determine whether at least one of the at least two high priority uplink transmissions is scheduled for repetitive uplink transmissions by a downlink control information (DCI) in a physical downlink control channel (PDCCH) based on a determination that the at least two high priority scheduled uplink transmissions of the two or more additional scheduled uplink transmissions overlap in the one or more slots of the at least the first slot and the second slot;

cancel one or more of any of the one or more low priority uplink transmissions and any of the at least two high priority uplink transmissions from the first slot that includes the repetitive uplink transmissions based on a determination that the at least one of the at least two high priority uplink transmissions is scheduled for repetitive uplink transmissions by the DCI in the PDCCH; and resolve one or more collisions between any of the one or more low priority uplink transmissions and any of the at least two high priority uplink transmissions for the second slot, wherein the at least two high priority uplink transmissions in the second slot corresponding to a repetitive transmission are configured as a high priority uplink transmission that is not scheduled by the DCI in the PDCCH.

33. The non-transitory computer-readable medium of claim 32, wherein the one or more processors are configured to forgo cancellation of any of the one or more low priority uplink transmissions that overlap with the high priority uplink transmission of the at least two high priority uplink transmissions until confirmation that the high priority uplink transmission of the at least two high priority uplink transmissions is transmitted in the second slot.

* * * * *